United States Patent [19]

Morgan et al.

[11] Patent Number: 5,220,674
[45] Date of Patent: Jun. 15, 1993

[54] LOCAL AREA PRINT SERVER FOR REQUESTING AND STORING REQUIRED RESOURCE DATA AND FORWARDING PRINTER STATUS MESSAGE TO SELECTED DESTINATION

[75] Inventors: William E. Morgan, Marlborough; Alec Carlson, Sterling; Daniel S. Cobb, Shrewsbury; Gerald S. Bell, Harvard, all of Mass.

[73] Assignee: Digital Equipment Corporation

[21] Appl. No.: 467,327

[22] Filed: Jan. 18, 1990

Related U.S. Application Data

[63] Continuation of Ser. No. 75,047, Jul. 17, 1987, abandoned.

[51] Int. Cl.$^5$ .................... G06F 13/38; G06F 3/12
[52] U.S. Cl. ............................ 395/800; 364/930; 364/940.62; 364/975.1; 364/235; 364/242.95; 364/DIG. 1; 395/110; 395/200; 395/275
[58] Field of Search ............... 395/200, 275, 325, 600, 395/800, 101, 110

[56] References Cited

U.S. PATENT DOCUMENTS

| | | | |
|---|---|---|---|
| 4,282,583 | 8/1981 | Khan et al. | 364/900 |
| 4,556,959 | 12/1985 | Allen et al. | 400/70 X |
| 4,635,189 | 1/1987 | Kendall | 364/200 |
| 4,651,278 | 3/1987 | Herzog et al. | 364/900 X |
| 4,754,428 | 6/1988 | Schultz et al. | 364/519 X |
| 4,897,781 | 1/1990 | Chang et al. | 395/650 X |
| 4,941,084 | 7/1990 | Terada et al. | 364/200 |

OTHER PUBLICATIONS

Enslow, P. H., "What is a Distributed Data Processing System", IEEE Computer, Jan. 1978, pp. 13–21.
Abrams, M. D., "Observations on Operating a Local Area Network", IEEE Computer, May 1985, pp. 51–65.
"Xerox System Integration Standard Printing Protocol XSIS 118404", by Xerox Corporation, Stamford, Connecticut, Apr. 1984, pp. 1–26.

Primary Examiner—Thomas C. Lee
Attorney, Agent, or Firm—Cesari and McKenna

[57] ABSTRACT

A local area print server for connection to a printer to form a printing system for servicing printing requests is disclosed. The local area print server both controls the servicing of printing requests by the printer, and in response to printer requests for resources needed to satisfy a printing request, either provides required resources, or obtains the resources from a remote component. A resource manager is provided for receiving resource requests from the printer for resources required to satisfy particular printing requests, and, in response to receiving such requests, forwards the necessary resources to the printer. There is also a status collector adapted for receiving status block messages internally generated by the printing system containing information regarding the changing state of the system and in response to receiving the messages retransmit same to one or more of the other local area print server internal modules that respond to specific printing system status changes.

10 Claims, 12 Drawing Sheets

LOCAL AREA PRINT SERVER FOR REQUESTING AND STORING REQUIRED RESOURCE DATA AND FORWARDING PRINTER STATUS MESSAGE TO SELECTED DESTINATION

This is a continuation of application Ser. No. 07/075,047 filed Jul. 17, 1987, now abandoned.

FIELD OF THE INVENTION

This invention relates generally to the field of digital data processing systems and more specifically to a local area print server which controls and selects the printing requests to be served by a printing system, provides resources the printing system may need, and informs other components of the digital data processing system of the status of the printing system.

BACKGROUND OF THE INVENTION

Most digital data processing (computer) systems include at least one printing system to produce printed records of data that has been interchanged and generated by other elements of the computer system. A typical printing system comprises a single, stand-alone printer designed to sequentially accept printing requests from the computer system it is connected to, and to process these requests in order to produce a printed copy of the information processed by the computer system. The printer may have a small memory which stores information necessary to process the print requests.

Over the years, computer systems have become very sophisticated. Some digital data processing computers include a very large, very fast processor. Other digital data processing computer systems include a number of processors that are connected together to form a cluster or network. Both types of systems are capable of processing large amounts of data very rapidly. As a result, modern digital data processing systems generate a large number of printing requests to produce the required hard copy records of the data they process.

The increased number of printing requests has created new demands on printing systems. For instance, most printing systems are unable to process printing requests as fast as they are received. This creates a back-up, as printing clients wait to have their printing requests acknowledged and serviced. To date, the response to this situation has been to provide high speed printers that are capable of processing printing requests at a rapid rate, and to provide computer systems with multiple printers so that a number of printing requests may be serviced simultaneously.

A disadvantage of the current way multiple printers are connected to a computer system is that each printer can only service printing requests from one processor or one group of processors. In some instances one printer may stand idle if it does not have any printing requests to service, while an adjacent printer, connected to a different group of processors, has a line or queue of unprocessed printing requests to service. In other words, the way multiple printers currently are attached to computer systems, they are unable to load balance the printing requests they receive, and as a result there is an inefficient use of the printers' services.

Also, printers currently being provided for computer systems have substantially greater capabilities than printers previously supplied. This is because the previous printers had keys which impacted on the paper to produce the desired image; the capabilities of these printers were limited by the type and number of keys they had. Currently, computer systems include non-impact printers such as laser printers and ink jet printers. Non-impact printers are able to produce an almost unlimited variety of alphanumeric characters, symbols, figurative and image representations on paper. Furthermore, the next generation of printers will be able to produce printed copy in an array of colors.

Current printers, particularly non-impact printers, require resources in order to produce the desired print copy. The resources are generally divided into two categories, namely, fonts and forms. Fonts are the instructions needed to produce specific characters and symbols on the paper. Forms include instructions directing where the characters should be placed on the paper. Some printers are also capable of using different hardware features to process different printing requests. These hardware features include such things as using paper from different trays for different printing requests, (i.e. from a tray filled with blank paper or one filled with letterhead paper depending on the destination of the printed copy, or based on different trays having different sizes paper in them), which output tray the printed copy should be deposited in, or if the printed copy should be deposited in the tray face up or face down. In an accounting environment, for example, form information may direct how a set of figures and descriptive text is displayed on a page, font information may direct the size and shape of the specific numbers and text, and printing instructions may direct from which tray paper is supplied to the printer in order to service the printing request.

The increased demand on printing systems has also made it necessary to provide individual printing systems with large amounts of resources. Different resources are regularly required by a printing system to service different printing requests. For instance, in a network environment, a first printing client may want the printing system to produce scientific output in tabular or figurative form and a subsequent printing client may want the printing system to produce a business letter. In this situation, the separate printing requests would require different resources. Moreover, color printers require additional resources which include the instructions necessary to produce color copy.

Problems arise because a printing system can usually only store a limited amount of resources. If a printing client wants a printing request processed that needs resources that the printing system does not have, it must send those resources along with the printing request or the request will not be satisfactorily serviced. A printing system can be provided with large amounts of storage space for resources; however, doing so substantially increases the cost of the printing system in order to provide resources that may be seldom, if ever, used. Thus, a printing system is usually limited in the types of printing requests it services, or the printing clients themselves must take the time to forward resources to the printing system in order to have more unusual printing requests serviced. In either situation, the overall efficiency of the digital data processing system is reduced.

Another consideration with a printing system is the system's ability to report its own status to other parts of the data processing system. For instance, after a printing client has generated a printing request for a printing system, it may later check on the request's status; i.e., whether the request was processed. Also, printing systems occasionally need to call attention to their own condition. For example if a printer runs out of paper, it may need to report to the printing clients that it is temporarily unable to process their printing requests, and to an operator who may be at a remote location that it needs attention. Currently, most printing systems are unable to do more than activate a local signal, such as flashing lights, to indicate their status. This has made it difficult to place printers at remote locations, such as at an office work station, since personnel who would be nearby but not immediately around the printer, for example, personnel at adjacent work stations, would not be made that the printer requires attention.

SUMMARY OF THE INVENTION

This invention provides a new local area print server for processing printing requests that are sent to a printing system, that responds to status requests regarding printing requests forwarded to the printing system, that provides the printers with resources which they may require to service printing requests, and informs the other components of the digital data process of the status of the printing system, such as when it receives printing requests or when it becomes inoperable and needs attention.

In brief summary, the local area print server is connected to one or more printers to form a printing system. The digital data processing system, which includes a number of printing clients is connected to the printing system through the local area print server. The printing clients make printing requests on the printing system. Resource servers, which store data which comprise printing resources, and file servers for temporarily storing data which comprise printing requests, may also be part of the digital data processing system. The digital data processing system may further include a service manager which exerts overall control over the computer system, including the printing system, and a terminal (usually called a console) that enables an operator to monitor and control the system.

The local area print server includes a network facility for interfacing with the data processing system components, such as the printing clients, and a driver for interfacing with the printers. A server job controller selects printing requests for servicing, accepts information needed to service the printing requests, and forward that information to the appropriate printer. A program control insures that the information forwarded to the printers is in a syntax understandable by them. A resource manager is used to process resource requests from the printers, and provide the resources from the local area print server, or arrange for them to be supplied from an external source. A status collector monitors the status of the printing and other events occurring in the local area print server, such as the changes in the status of printing requests being serviced. A system manager monitors the status of the printing system and controls its operation based on instructions received from either the service manager or the operator monitoring the printing system.

When a printing client makes a printing request of the printing system, the request is sent to the local area print server. The request is initially processed by the network facility which determines it is a printing request and forwards it to the server job controller. The server job controller is informed of the status of the printers by the status collector which monitors their status. When the server job controller receives an indication from the status collector that a printer is available for servicing a printing request, it forwards that information to the printing client; the printing client then forwards the printing data and other information, such as font information or printing instructions, which comprises the printing request to the local area print server. The printing data and other information is forwarded to the printer through the network facility, the server job controller, the program control, and the driver. The program control converts the printing data and printing instructions into a syntax understandable by the printer.

If the printer needs a resource to service a particular printing request, it informs the resource manager through the driver. The resource manager initially attempts to supply the needed resource from resources stored locally by the local area print server. If the needed resource is not locally available, the resource manager attempts to obtain the resource from another component of the digital data processing system, such as the resource server.

Other components of the digital data processing system, such as the service manager, may give instructions to the digital data processing system. These instructions may be commands to terminate a particular printing request, or to give a printing request priority for immediate servicing. These instructions are received by the network facility and forwarded to the system manager. The system manager then arranges for the execution of these instructions by issuing further instructions, typically to the server job controller.

The system manager also monitors the current status of the printing system by receiving and interpreting events collected by the status collector. If a particular event requires external attention, such as one of the printers requires servicing, the status collector arranges to have an appropriate message forwarded to another digital data processing system component, such as an event logger or an operator console facility.

The local area print server constructed in accordance with this invention increases the efficiency of the digital data processing system. Printing clients are able to receive immediate acknowledgements of their printing requests. The local area print server is able to assign the printing requests to printers as they become available to service printing requests. In other words, the local area print server balances the servicing of printing requests so there is an efficient use of the printers attached thereto. If the printers attached to a particular local area print server are unable to service a particular printing request, the printing client is informed, and at its option it may seek to have it served by printers attached to another local area print server. This further maximizes the efficiency of the printers attached to the local area print servers.

If a printer servicing a particular printing request does not have a resource needed to service a printing request, it can request the needed resource from the local area print server. If the local area print server cannot provide the requested resource, the local area print server attempts to obtain the resource from another source. The local area print server also informs other components of the digital data processing of the status of the printers. This enables the printing clients, and an operator monitoring the system, to be immediately notified whenever a printer requires some machine or operator attention.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 8b is a diagram depicting the structure of an invent list entry created and maintained by a status collector of the local area print server of this invention to contain status information regarding a portion of the local area print server or a printer that it is connected to;

DETAILED DESCRIPTION OF AN ILLUSTRATIVE EMBODIMENT

Overview

Figure 1:
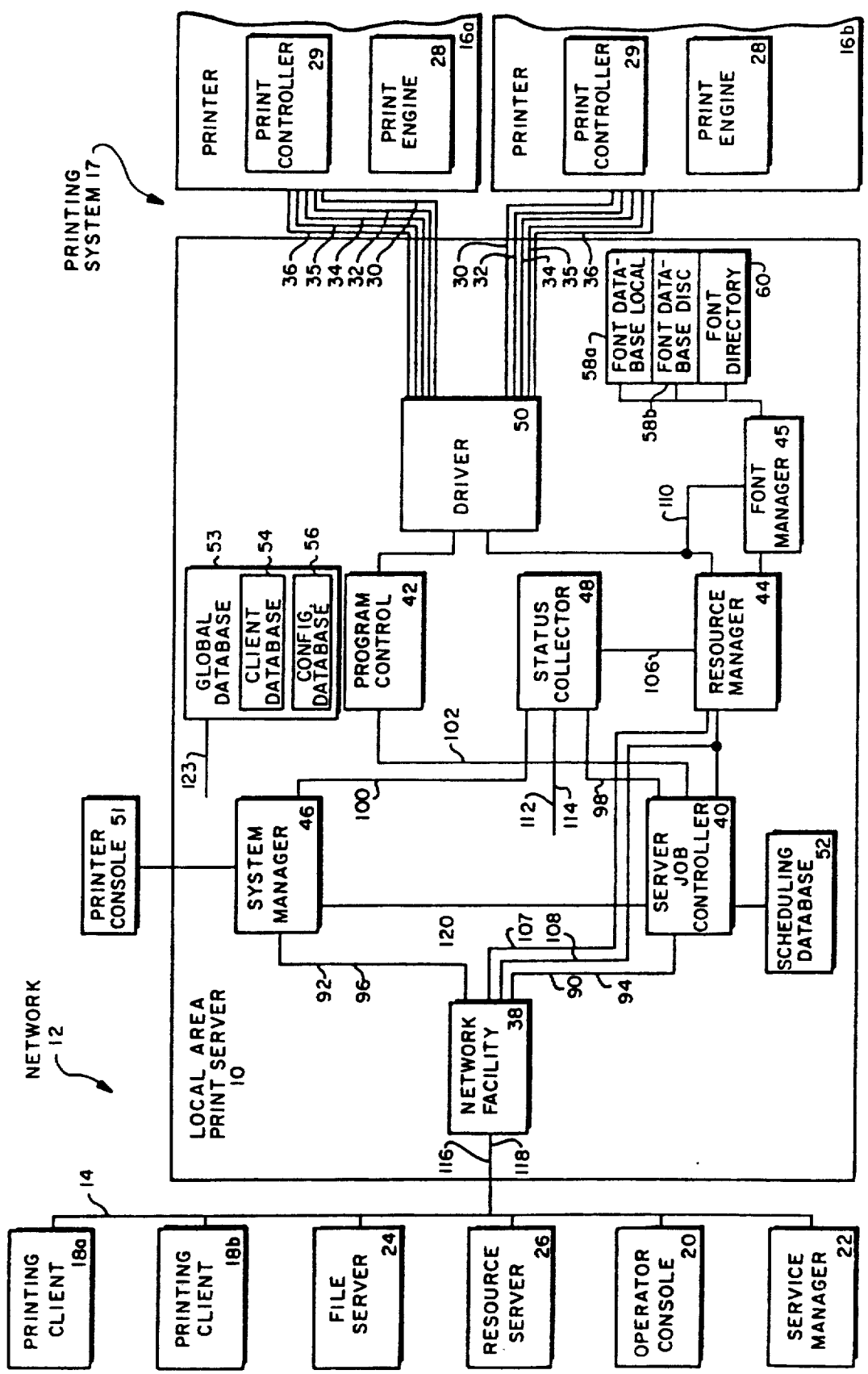
FIG. 1 is a general block diagram of a local area print server implemented in accordance with this invention.

FIG. 1 depicts a local area print server 10 in a network 12 which comprises a digital data processing system. The local area print server 10 is connected to the network 12 by a communication link, or bus 14, which allows communication between the components that comprise the network 12. A number of printers, generally identified by reference numbers 16, (two printers 16a and 16b are depicted), are also connected to the local area printing server 10. Collectively, the local area print server 10 and the printers are known as a printing system 17.

The network 12 includes a number of components including processing units, represented by printing clients 18a, 18b, that make printing requests on the printing system 17. One or more components of the network 12 may have a terminal designated as an operator console 20 that allows an operator to monitor and control the activities of the network 12, including programs that are running on it. A service manager 22 may be provided to automatically monitor and control the operation of the network 12.

In many networks 12 the operator console is a terminal controlled by a utility application running on a remote system, such as the service manager 22 or on one of the printing clients 18a, 18b. Typically, however, the operator console 20 is used for communication with applications and utilities running on the network 12 and the service manager 22 is only used to send commands to "hosts and servers," described hereinafter, and to receive responses to those commands. In some networks 12, it may be desirable to combine the functions and duties of the operator console 20 and the service manager 22.

The network 12 may also include a number of storage devices including a file server 24 and a resource server 26. The file server 24 stores information used and generated by the printing clients 18a and 18b. The resource server 26 stores resources necessary to service printing requests. For example, the resource server 26 may store fonts, which are the instructions needed by the printers 16a, 16b to produce specific characters and symbols, and forms which are instructions used to control where the characters and symbols are to be produced on the page, and standard text and figures to be produced on the page. Depending on the construction of the particular network, the operator console 20, the file server 24 and resource server 26 may each be omitted, made part of the printing clients 18a, 18b, or the service manager 22, or integrated into a single processing system.

In brief, the local area print server 10 of this invention accepts printing requests from the printing clients, generally identified as 18, and arranges for them to be serviced by the printers 16. Each printing request has associated with it specific printing data that is to be printed, and printing instructions identifying fonts and forms to be used to service the request. The printing instructions may also have context instructions which include the size of paper the data is to be printed on and the format on which it is printed, for example landscape, (greater width than height), or portrait, (greater height than width). Other printing instructions allow the printing request to select hardware features that are associated with the request. The hardware features include: the tray used to supply paper for the printing request, (i.e. a tray with blank paper or one with letterhead stationary); the output tray where the printed output is delivered; or whether the paper is delivered face-up or face-down.

When the printing system 17 is ready to service a printing request, the local area print server 10 identifies the printing request that should be serviced. This request may be the one that has been waiting for service the longest, or one that another network component 18-26 has instructed should be serviced first. After the local area print server identifies the printing request to be serviced, it informs the printing client 18a, 18b that made the printing request that the request has been accepted. The printing client 18 either forwards the printing data and printing instructions to the local area print server 10, or provides a pointer to the location of the data which the local are print server 10 uses to obtain it.

After the local area print server 10 receives the printing data and the printing instructions it forwards them to one of the printers 16 which produces printed copy based upon them. If the printer 16a, 16b does not have a specific resource locally available to service a printing request, the local area print server 10 may provide the resource from an internal collection of resources which it maintains, or it attempts to have the resource supplied from another component of the network 12, such as the resource server 26.

The local area print server 10 monitors the status of events occurring internally and within the printers 16a, 16b. This enables the local area print server 10 to respond to status queries from other components that are part of the network 12. For instance, a printing client 18a, 18b can inquire of the print server 10 to determine whether a particular printing request has been accepted by the printing system 17 and later serviced by it. Alternatively, the printing client 18a, 18b, an operator at the operator console 20 or the service manager 24 may query the printing system 17 regarding the number of pages printed during the servicing of a particular printing request.

The local area print server notifies the other components of the network 12, such as one or more operator consoles 20, whenever it or the printers 16a and 16b need attention. For example, the local area print server 10 can arrange to have an appropriate message displayed on an appropriate operator console 20 whenever one of the printers 16a, 16b needs paper.

The service manager 22, or an operator at the operator console 20, can issue commands and queries to the printing system 17 through the local area print server 10. These commands and queries include the ability to add or delete printing clients 18 authorized to use the printing system 17, to add, delete or modify resources available to the printing system 17, to cancel printing requests, and to make queries regarding the status and capabilities of the printing system. Furthermore, the printing system 17 can be directed to service a high priority printing request before other printing requests, that were made earlier, are serviced.

With this background, the local area print server 10, and the environment in which it may be used, will be discussed in more detail.

The network 12, also referred to as a local area network, is comprised of a number of different stations, referred to as nodes. In the described embodiment of the invention, the printing system 17, the printing clients 18a, 18b, the service manager 22, the file server 24 and the resource server 26 are each a different node on the network 12. Communication between each node on the network 12 and every other node on the network 12 is possible over a high speed communications link, the bus 14, in accordance with a network communications protocol not a part of this invention.

Generally the nodes on the network can be divided into two classes; hosts and servers. A host provides shared access to a component or group of components on the network 12 that one or more users that want to take advantage of. For instance, users may be human or machine operators that want to run programs, referred to as applications, on the network's computing system. A specific user thus uses the services of a particular processor which may be one or a group of processors controlled by a single host. Servers, on the other hand, are centralized units that provide facilities used by other hosts and servers in the network. The file server 26, for example, provides a central storage location or service for the other components of the network. The printing system 17 is a "printing server" for the other components of the network 12, and exists to accept their printing requests and produce printed copy based upon them.

The processes running on the hosts or servers that provide access to downline servers are referred to as "clients" that obtain the downline servers' services on behalf of "users" that require the services of the end servers. For example, the printing clients 18a, 18b can each be hosts which control one or more processors on which one or more programs, called "applications", are running. Each application may make one or more printing requests that require the printers 16 to generate a paper record of the information processed by the application. When an application makes a printing request, it is a user that desires the services a printer to service its printing request. The host, which may be at a remote node relative to the node the application requiring the services of a printer 16, may server as the printing client 18 for the particular application, and arrange access to the printer 16 through the print server 10 on its behalf.

Depending on the construction of the particular computer system, the operator console 20, the file server 24 and the resource server 26 may all be applications running on a specific host system. Also, the service manager 22 may be integrated into the host system.

The printers 16 each include a print engine 28, which is used to produce the printed image on paper, and a print controller 29. The print controller 29 directs the production of print copy by the print engine 28. To service a printing request, the print controller 29 accepts printing data and printing instructions from the local area print server 10 and then converts them into the instructions which are used by the print engine 28 to produce printed copy. Printing data is transmitted from the local print server 10 to the printers 16 over a printer data link 30; printing instructions are similarly transferred over a printer control link 32.

The print controllers 29 each have a limited memory for storing resources, such as fonts or forms, needed to produce the necessary instructions for the print engine 28. If a printer does not have a needed resource for a particular printing request locally available, the printer 16a, 16b can transmit a resource request for the resource from the local area print server 10 in the form of a resource fault over a printer resource fault link 34 connected therebetween. The local area print server 10 can forward resources to the printer 16 in response to receiving a resource fault over a printer resource link 35 connected therebetween.

The printer controllers 29 are also capable of monitoring events and conditions which occur within the printers 16a, 16b, including the condition of the print engines 28. Events and conditions which the printer controllers 29 monitor include the successful receipt of printing data and printing instructions enabling a printing request to be serviced, or when the paper supplies to print engines 28 are empty and need refilling. A printer status link 36, connected between each of the printers 16a, 16b and the local area print server 10, enable the printers to report these events and conditions to the local area print server.

In the illustrated embodiment, the printer data links 30, printer control links 32, printer resource fault links 34, the printer resource links 35 and printer status links 36, are depicted as distinct connections between the printers 16a, 16b and the local area print server 10. These links 30-36 may be separate, or combined into one physical link. For instance, the printer resource fault link 34 and the printer status link 36 are typically combined. Moreover, depending on a particular printer's 16a, 16b capacity to accept resource data, there may be a number of printer resource links 35 connected between the local area print server 10 and each printer 16a, 16b.

The local area print server 10 has a number of server internal modules 38-50 that control the flow of information within the local area print server 10, and between the local area print server and the printers 16 and the other network components 18-26. The server internal modules 38-50 and the other components of the network 12 operate in accordance with a print server protocol, described herein, so printing requests made by the printing clients 18a, 18b are efficiently serviced.

In summary, a network facility 38 is connected to the bus 14 and functions as an interface to other components of the network 12. A server job controller 40, receives printing requests from the printing clients 18a, 18b through the network facility 38 and selects the order in which they will be serviced. In particular, the server job controller 40 receives printing data, printing instructions and resources from the other network components 18-26 and forwards them to a program control 42 so they may be sent to one of the printers 16a, 16b.

The program control 42 receives printing data and printing instructions from the server job controller 40 and forwards this information to the appropriate printer 16a, 16b. If necessary, the program control 42 also codes this information into a syntax understood by the print controller 29 so the information will be properly converted into printing instructions for the print engine 28. A resource manager 44 acts as a clearinghouse for resource requests made by the printers 16a, 16b. The resource manager 44 can supply the printers 16 with the resource they requested from either the local area print server 10, or from another network component 18-26.

A system manager 46 serves as the controller for the local area print server 10. The system manager 46 initializes the local area print server 10 when it is first activated. Commands issued to the printing system 17 by either the service manager 22 or through the operator console 20 are processed by the system manager 46. The system manager 46 is responsive to queries made by printing clients 18a, 18b and other components of the network 12 regarding the status of the local area print server 10, the printers 16a, 16b, printing requests, and available resources. The system manager also informs the appropriate other network components 18-26 whenever a part of the printing system 17 requires attention.

A dedicated printer console 51 may be connected to the local area print server 10 through the system manager 46. The printer console 51 is used only to monitor the status of the components of the printing system 17 and to make commands regarding the operation of the printing system 17 and printing requests received by it.

A status collector 48 serves as an event logger for activities and conditions that occur within the printing system 17. The status collector receives reports of the events and activities that occur within the printing system, and if necessary forwards a report of the status changes to other server internal modules, usually server job controller 40, the resource manager 44, or the system manager 46 so they may take appropriate action.

A driver 50 serves as the interface between the local area print server 10 and the printers 16a, 16b. All information exchanged between the printers 16a, 16b and the local area print server 10 passes through the driver 50. The printer data link 30, printer control link 32, printer status 36 link, and printer resource link 34 all pass through the driver 50.

The local area printer server 10 also maintains a set of databases 52-60 which store information used by the printing system 17 in its operation. Collectively, the server internal modules 38-50 and the databases 52-60 are referred to as server internal elements 38-62.

A scheduling database 52 is maintained by the server job controller 40 to store a client priority list so the server job controller 40 can choose the next network component 18-26 it should communicate with for accepting printing requests, printing data, printing instructions, or resources from.

A global database 53, maintained by the local area print server 10, contains general information necessary for the operation of the print station 17. The global database 53 includes a client database 54 which contains a list of printing clients 18a, 18b that are authorized to use a particular local area print server 10 and the printers 16a, 16b that are attached to it. The client database 54 also contains information regarding the status of current client connections to the print station 17 and the order in which printing requests are queued for servicing. The global database 53 also includes a configuration database 56. The configuration database 56 contains parameters, including default parameters, needed to insure the proper operation of the print station 17. The information contained in the configuration database 56 includes how many connections the local area print server 10 can maintain, the defaults, including the default parameters associated with the printing requests, and the context of printing requests currently being serviced.

The local area print server 10 has a set of font databases 58a and 58b which store resources necessary to service the printing requests. One font database 58a may be within the memory of the local area print server 10. The other font database 58b may be a disk memory that is exclusively accessed by the local area print server 10. The which are the instructions the printing controllers need to produce images of each of the individual characters the printers 16a, 16b generate.

A font directory database 60 stores information regarding the availability of resources in the font databases 58 and elsewhere, that can be accessed by the local area print server 10. The font directory 60 includes the locations of the resources and their storage requirements while in memory. If the font is within the font database 58a of the local area print server 10, the font directory includes the information needed to reference particular fonts.

Access to the font databases 58a, 58b and the font directory 60 is only through a private interface to a font manager 45 which is a sub-unit of the resource manager 44.

SPECIFIC DESCRIPTION OF THE INVENTION

A. Data Packets and Status Blocks

The local area print server 10 operates by transferring information between the other network components 18-26 and the printers 16a, 16b. The information received by the local area print server 10 is processed, stored, and transferred between the previously described server internal elements 38-60 in accordance with the print server protocol now described in greater detail.

Information, called server data, is transferred between the server internal elements 38-60 through interconnections called ports 90-123 which will be described hereafter. A port 90-123 is a temporary communication link which is opened as the need for the server data transfers arise and closed when the transfer is completed.

Figure 2A:
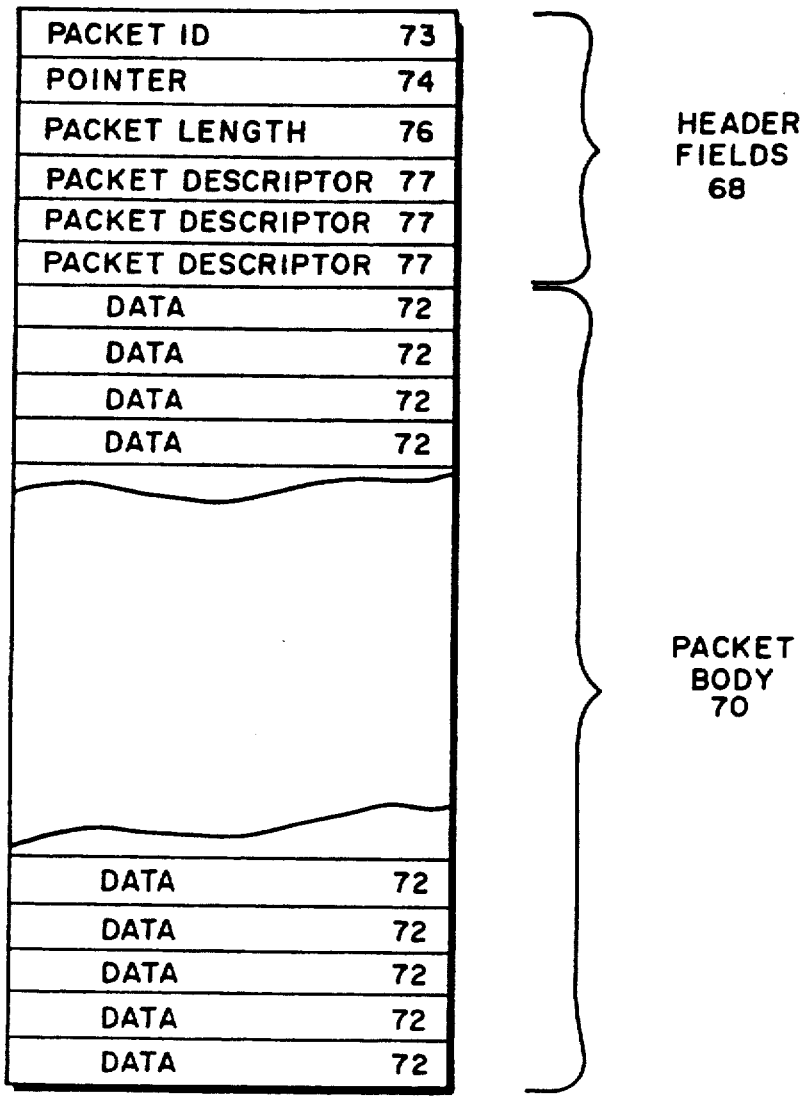
FIG. 2a is a diagram depicting the structure of a data packet which is used to transfer information within the local area print server in accordance with a print server internal protocol.

FIG. 2a depicts the format of a data packet 66 in which one or more blocks of information are transferred between the server internal elements 38-60 over the ports 90-123. Data packets 66 are created by the server internal element 38-60 that first receives or generates the blocks of data such as printing data, printing instructions, or resources. Data packets 66 are also created by a server internal element 38-60 that knows of a particular need for a new data packet 66. Data packets 66 are returned to a pool of unused data packets when the server data they contain has been completely processed. This is typically done by the last server internal element 38-60 that reads the information contained in the specific data packets 66.

In some implementations of the local area print server 10, data packets 66 are sent directly to the print controller 29 with the printing instructions needed to generate printed copy. In these implementations, the print controller 29 is often responsible for returned the data packets 66 back to the local area print server 10 as an indication that it has satisfactorily processed the information contained therein.

Each data packet 66 includes a set of header fields 68 and optionally a packet body 70. The header fields 68 contain the information necessary to insure the packet body 70 is transferred to the proper server internal element and appropriately processed. The packet body 70 is composed of one or more server data fields 72 that contain the information being transferred between the server internal elements 38-64.

The header fields 68 contain information that describe the characteristics of the specific data packet 66. A packet identifier field 73 indicates from which server internal element 38-60 the data packet originated. A packet pointer field 74 contains pointers to indicate the server internal element 38-60 the data packet 66 should be forwarded to. A packet length field 76 describes the length of the data packet 66.

There may be a number of packet descriptor fields 77 which describe characteristics of the information contained in the data packet. The packet descriptor fields 77 may contain the following information: the type of information contained in the data packet; flags to indicate if the data packet is the first or last data packet of a particular information stream; a description of the syntax of the information in the data packet; or pointers to indicate the location of information in the data packet.

In addition to creating and destroying the data packets 66, the server internal elements 38-60 also update both the header fields 68 and the packet bodies 70 before transferring the data packet to the next server elements.

Figure 2B:
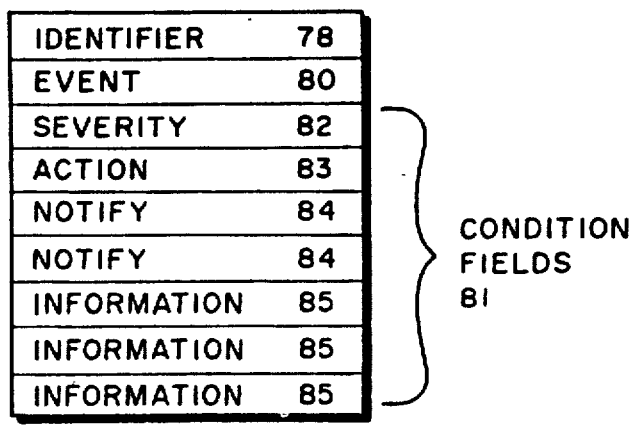
FIG. 2b is a diagram depicting the structure of a status block which is used to transfer information regarding activities and events occurring within the printing system in accordance with a print server internal protocol.

FIG. 2b depicts the format of a status block 78 used to contain information regarding activities and events that occur within the printing system 17. As will be discussed hereinafter, status blocks 78 are initially transferred to the status collector 48 from the other server internal modules 38-46 and 50. Status blocks 78 containing information about and regarding the activities and events of the printers 16a, 16b are forwarded to the status collector through the driver 50.

Each status block 78 contains an identifier field 79, and an event field 80 and a set of one or more condition fields 81. The identifier 79 field contains information identifying the server internal processor 38-46 and 50 or printer 16 that generates the status block 78. The event field contains information indicating what specific activity or event occurred that the status collector 48 is currently being notified of.

The condition fields 81 contain further information about the specific activity or event. The condition fields 81 include a severity field 82 which contains information regarding the seriousness of the activity or event. An action field 83 contains information regarding what the response should be to the reported activity or event. There may be a set of notify fields 84 that contain information regarding what local area print server 10 and network 12 components should be notified of a specific event. For example, if one of the printers 16 runs out of paper, the notify field 84 may contain an indication that this information should be displayed to an operator, which would cause it to be displayed on the printer console 51, sent to a selected operator console 20 for display there, and sent to the server job controller 40. There may are also be a set of information fields 85 which contain information regarding the activity or event in a syntax that can be translated to a form understandable by the operator.

B. Server Internal Ports

Once created, the data packets 66 and status blocks 78 are transferred between the server internal elements 38-60 over the ports 90-123. A server job controller message port 90 is established between the network facility 38 and the server job controller 40 for data packets 66 transferred from network facility to the server job controller. (The ports are represented by lines between the server internal elements 38-60 in FIG. 1; more than one port may be represented by each line.) Printing requests, printing data, printing instructions, and resources, are transferred over the server job controller message port 90. A system manager message port 92 transfers data packets 66 from the network facility 38 to the system manager 46. Data packets 66 containing commands and queries about the operation of the printing system 17 are transferred over the system manager message port 92.

A server job controller event port 94 is established for sending status blocks 78 between the server job controller 40 and the network facility 38. The server job controller event port 94 is created by the server job controller 40 when it has information to send to other network components 18-26. This information includes messages regarding the status of printing requests or resource requests. A system manager event port 96 is created for sending status blocks 78 from the system manager 46 to the network facility 38 for retransmission to another network component 18-26. The information the system manager may have for retransmission generally regards the status of some portion of the printing system 17.

A server job controller notify port 98 is created by the server job controller 40 and used by the status collector 48 to send status blocks 78 containing information about status changes to it. The server job controller notify port 98 is used when the status collector 48 records a change in the status of the printing system 17 that is of interest to the server job controller 40 and/or the printing clients 18, and reports that status thereto. A system manager notify port 100 is connected between the system manager 46 and the status collector 48. The system manager notify port 100 is used by the status collector 40 to transfer status blocks 78 containing information regarding events and conditions within the printing system 17 that the system manager 46 may need to be notified of.

A program control data port 102 is established between the server job controller 40 and the program control 42. All data packets 66 that contain printing data and printing instructions are transmitted over the program control data port 102 to the program control 42 and then to the driver 50 so that the printing data and printing instructions will eventually be transmitted to the printers 16a, 16b. Data packets 66 are transferred between the program control 42 and the driver 50 over a driver data port 104 connected therebetween.

A resource manager fault port 106 is created by the resource manager 44 and connected to by the status collector 48. The resource manager fault port 106 is always established, and is used whenever the status collector 48 has to send a status block 78 containing notice of a resource needed by one of the printers 16a, 16b, and locally unavailable to it. An external resource fault port 107 is established by the network facility 48 and connected to by the resource manager 44 whenever there is a resource fault that the resource manager 44 attempts to satisfy by requesting the needed resource from a network 12 component separate from the local area print server 10.

A resource manager data port 108 is connected between the server job controller 40 and the resource manager 44. The resource manager data port 108 is established by the resource manager 44 and connected to by the server job controller 40 whenever it has data packets 66 containing resources for the resource manager 44. The resource manager port 108 may also be connected to by the network facility 38 whenever the resource manager 44 is in communication with the resource server 26 in order to accept resource information therefrom. A driver resource port 110, connected between the resource manager 44, the font manager 45 and the driver 50, is used by the resource manager 44 and font manager 45 for forwarding data packets 66 containing resources received from the server job controller 40, the resource server 26 through the network facility 38 or the font manager 45 for the printers 16a, 16b. These resources are forwarded to the printers 16a, 16b through the driver 50 over the driver resource port 110.

A status collector post port 112 is established by the status collector 48 and opened by the other server internal elements 38-46, 50-64 to transmit status blocks 78 containing information regarding an event, status or counter change, or other internal conditions of the printers 16a, 16b and local area print server 10 which the status collector 48 monitors and keeps a record of. For instance, when one of the printers 16a, 16b has a status change, notification of the change is first sent to the driver 50 over the printer status line 36. The driver 50 then sends notice of the status change to the status collector over the status collector post port 112.

A status query port 114 is a bidirectional port established by the status collector 48 and used by other server internal elements 38-46, 50-64. The status query port 114 is used by the server internal elements 38-46, 50-60 to send status queries regarding the status of events occurring within the printing system 17 which are recorded by the status collector 48. The status collector 48 transmits the responses to the status queries back to the other server internal elements 38, 46, and 50-60 over the status query port 114. After the status information is supplied by the status collector 48 it closes the status query port 114.

The network facility 38 is connected to the bus 14 by a network receive port 116 and a network send port 118. The network receive port 116 is used by the other network components 18-26 to send information to the local area print server 10. The network send port 118 is used by the network facility 38 to send information from the local area print server to the other network components 12 over the bus 14.

A server job controller command port 120 is connected between the system manager 46 and the server job controller 40. The system manager 46 uses the server job controller command port 120 to transmit data packets 66 containing commands to the server job controller 40. These commands include instructions to delete printing requests, change the parameters of printing requests, and to change the priority of printing requests.

Therefore in addition to the above-described ports, a global database interface 123 is maintained by the network facility, the server job controller, the system manager, the resource manager and the driver 50 for accessing and updating the global database 53. The global database interface 123 is also used by the server internal modules 38-50 to access the scheduling database 52, the client database 54 and the configuration database 56.

C. Server Internal Modules

A more complete understanding of the local area print server 10 may be gained by an explanation of the operation of the server internal modules 38-50 which are depicted in FIGS. 3-9.

Figure 3:
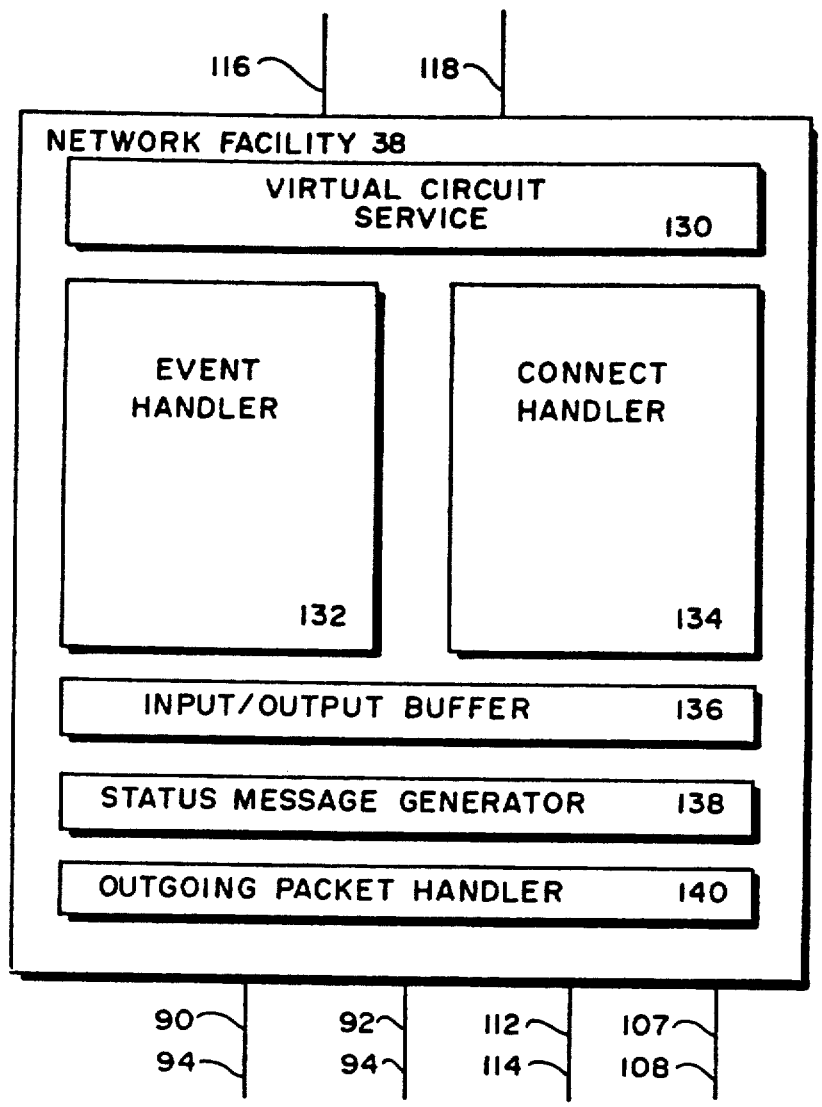
FIG. 3 is a diagram depicting the structure of a network facility of the local area print server of this invention.

The network facility 38, depicted in FIG. 3, serves as an interface between the printing system 17 and the other components of the network 12 connected to the bus 14. The network facility includes a virtual circuit server 130 for establishing and maintaining temporary communication links, called virtual circuits, over the bus 14. The virtual circuits are established over the network receive port 116 and the network send port 118. The virtual circuits are bidirectional, in other words, at any one instant another network component 18-22 that is sending information over the network receive port 116 may also be receiving information over the network send port 118.

A virtual circuit is established each time one of the other network components 18-26 has information to communicate with the printing system regarding a specific matter. For instance, if one of the printing clients 18a, 18b has made two or more printing requests to the printing system 17, a separate virtual circuit will be established for each printing request.

The network facility includes an event handler 132 which is used to generate data packets 66 that contain event messages to the server's internal elements that receive information from the network facility 38, the server job controller 40, the resource manager 44 and the system manager 46.

Information which comprises printing requests, printing data, printing instructions and resources needed to service a printing request are forwarded to the server job controller 40. Information which comprises resources sent to the local area print server 10 in response to a resource fault are forwarded to the resource manager 44. Information which comprises status queries about the conditions and capabilities of the printing system 17, and commands to add or delete printing clients, delete printing requests or assign a lower priority printing request to a higher priority position, to change the default parameters of printing requests, or to modify the resources maintained by the printing system 17 are forwarded to the system manager 46.

Upon receiving an event message, the server job controller 40, the resource manager 44 or system manager 46 sends an accept message back to the event handler 132 when it is able to accept the information from the other network component. The event handler 132 then forwards the information in the form of data packets 66 and terminates the connection when it receives an end-of-data message flagging the end of each stream of information.

A connect handler 134 is used by the network facility 38 to establish connections between the local area print server 10 and a designated process running on one of the other network components 18-26. The connect handler 134 interacts with the virtual circuit server 130 to forward information, such as resource requests and notices of conditions requiring operator attention, to the other network components 18-26. There are a set of input-output buffers 136 for the temporary storage of information in and out of the network facility 38.

The network facility 38 and the other server internal elements 40-62 are each provided with separate status message generators 138 and outgoing packet handlers 140. The status generator 138 generates status blocks 78 that contain status messages about events within the network facility 38 for transmission to the status collector 48 over the status collector post port 112.

The outgoing packet handler 140 reads the header fields 68 of the outgoing packet and directs the packet to an appropriate port 90-123. For example, the network facility outgoing packet handler 140 reads the header fields 68 of outgoing data packets 66 generated by the event handler 132 and the status generator 133. Data packets 66 generated for the server job controller 40 are transferred to it through the server job controller message port 90; data packets generated for the system manager 46 are sent to it through the system manager message port 92.

Figure 4:
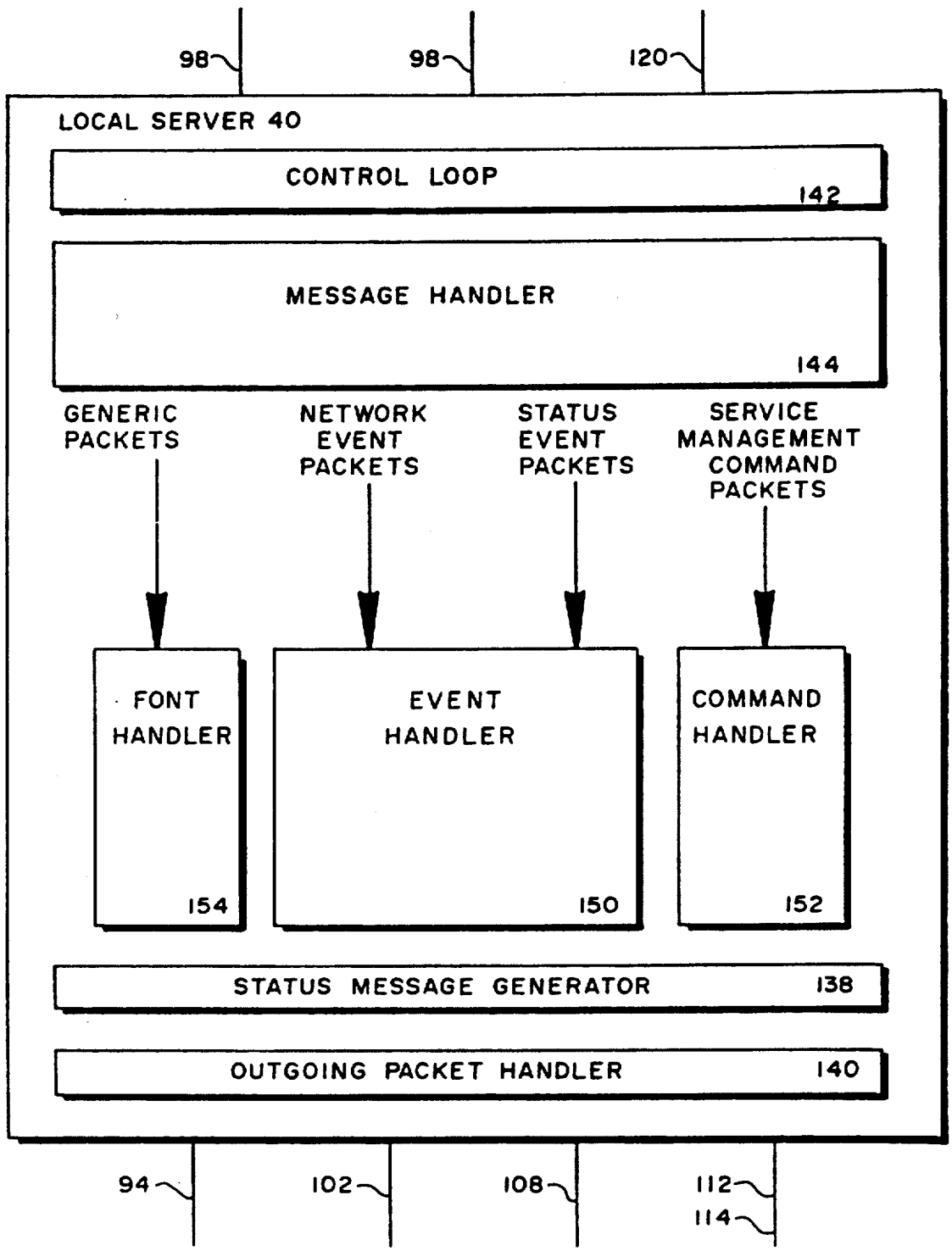
FIG. 4 is a diagram depicting the internal elements of a server job controller of the local area print server of this invention.

The server job controller 40, depicted in FIG. 4, is responsible for selecting printing requests for servicing, and forwarding printing data printing instructions to the printers 16. The server job controller 40 may also make resources requests on the printing client 18 for resources needed to satisfy printing requests that are currently being served, and forwards the requested resources, when available, to the printers 16. In order to function, the server job controller 40 receives data packets 66 from two sources; the network facility 38 and the system manager 46. The server job controller also receives status blocks 78 from the status collector 48 containing information about events occurring within the printing system 17. The network facility 38 forwards printing requests, printing data, printing information and resources needed to satisfy the printing request currently being serviced. The status collector 48 forwards information regarding the printing system 17, such as that a particular printing request has been completely serviced, or resources not locally available to the printing system are needed to service a printing request. The server job controller has a control loop 142 that receives all the data packets 66 forwarded to the server job controller 40 and determines which one will be processed first. The control loop 142 establishes the priority for the incoming data packets 66 by reference to the scheduling database 52 that maintains a priority list for the order in which the incoming data packets 66 should be processed by the server job controller 40.

A message handler 144 reads the incoming data packets 66 from the control loop 142, checks them for validity and consistency. The message handler 144 then strips the data packets 66 of their header fields 68 and, depending on their contents, dispatches them to an event handler 150, a command handler 152, or a font handler 154 within the server job controller 40.

The event handler 150 is used by the server job controller 40 to process information received from the network facility 38 and the status collector 48. For instance, if a data packet 66 from the network facility contains a new printing request, the event handler 150 checks the identity of the printing client against those listed in the client database 54 to verify that the printing client is authorized to use this printing system 17. If the printing request is from an authorized client 18a or 18b, it is stored in a first-in-first-out list maintained in the client database 54. The event handler 150 then notifies the printing client 18a or 18b on the status of the request, that is, whether it is accepted for current servicing, pending for future servicing, or rejected. If the event is a cancellation of a print request, the event handler removes the request from the client database 54 first-in-first-out list, if the request is in storage, or notifies the program control 42 if the request is active so it may be canceled by the printer 16a, 16b servicing it.

The event handler 150 also responds to changes in the printing system 17 reported to the server job controller 40 by the status collector 48. For example, if a printer 16a or 16b goes off line it reports its status change, and the reason for it, to the local area print server 10. The status change is received by the driver 50 which forwards notice of the change to the status collector 48 which retransmits a report of the status change to the server job controller event handler 150. Depending on the reason for the printer status change, the event handler takes appropriate action; if the printer 16a or 16b goes off-line because it is servicing a printing request, the printing clients 18 may be so notified. When the event handler receives a printer status change indicating a printing request has been completely serviced it notifies the current printing client 18a, 18b that its request has been processed, and it then retrieves the highest priority printing request from the client database 54 first-in-first-out list and notifies the next printing client 18a, 18b that its request has been accepted for processing.

The event handler can also assign printing requests to the printers 16. When the event handler receives a report, in the form of a status block 78, that a particular printer 16a or 16b is available to service a printing request, the event handler retrieves the top most available printing request from the first-in first-out list in the client database 54 that that particular printer 16a or 16b can serve and assigns it to the printer. The event handler then informs the printing client that that request has been accepted for servicing.

As well be discussed in more detail hereinafter, the resource manager 44 receives resource faults from the printers 16 if they need a specific resource in order to service a particular printing request. The resource manager 44 then attempts to forward the requested resource to the printer 16a, 16b. If the resource manager 44 is unable to obtain the resource needed to satisfy the fault, it forwards a status block 78 reporting that event to the status collector 48. The status collector 48 in turn forwards the status block 78 to the server job controller 40. The server job controller event handler 150 receives this information and in response notifies the printing client 18a or 18b of the resource failure for the particular printing request.

The command handler 152 responds to information received from the system manager 46 by the server job controller over the server job controller command post 120. The information from the system manager 46 comprises printing system commands to change the servicing of printing requests. The command handler 152 responds to the printing system commands by modifying the contents of the client database 54. The command handler may make three types of modifications to the client database 54:

1) Delete a printing request from the first in/first out printing list. When this is done, the host serving as the printing client 18a or 18b is informed of the deletion. If the printing request deleted is currently being serviced, the appropriate termination commands are transmitted to the printer 16a or 16b through the program controller 42.

2) Boost a printing request to the top of the first in/first out list. If no other printing request is boosted before the printers 16a, 16b are next able to accept a printing request, the boosted printing request will be the next one serviced.

3) Modify the context instructions supplied with the printing request with those supplied by the server management command description.

The font handler 154 processes resource information forwarded to the local area print server 10 from the printing clients 18 to satisfy resource requirements for printing requests that are currently being processed. The font handler forwards the resource information to the printers through the resource manager 44 through the resource manager data port 108.

The server job controller may have a retrieval routine, not illustrated, to retrieve data from sources external to the local area print server 10. The retrieval routine may be any well known process by which the server job controller 40 can retrieve information stored externally to the local area print server 10. The retrieval routine would be used for example if the server job controller 40 retrieved from the printing client information regarding the location of data comprising printing instructions rather than the data itself; the retrieval routine would be used by the server job controller to retrieve the data from the location it is stored at.

Figure 5:
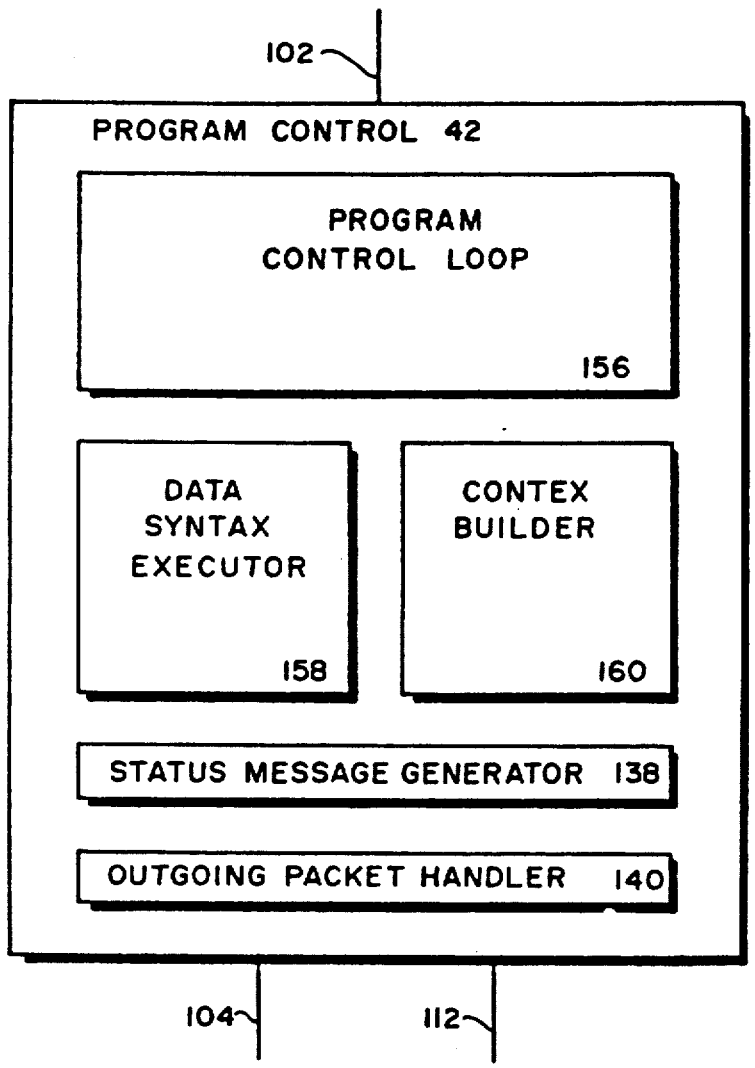
FIG. 5 is a diagram depicting the internal elements of a program control of the local area print server of this invention.

The program control 42, depicted in FIG. 5, accepts data packets 66 from the server job controller 40 containing printing requests, printing data and printing instructions and prepares them for the printers 16a, 16b. The program control 42 includes a program control loop 156 that inspects incoming data packets 66 when they are first received by the program control 42. If the data packets 66 contain data in a syntax the driver 50 and printers 16a and 16b cannot understand, the packets are directed to a data syntax executor 158. If the data packets 66 contain printing instructions that need further processing, they are directed to an instruction context builder 160. If the data packets 66 do not need modification, they are dispatched from the program control directly to the driver 50 for retransmission to the printers 16a, 16b.

If the data packets 66 that contain printing data or printing instructions carry a flag indicating the information they contain is in a syntax not understood by the driver 50 or print controller 29, they are forwarded to the data syntax executor 158.

The data syntax executor 158 converts the data in the data packets 66 into a syntax understandable by the driver 50 and the printers 16a, 16b. The data syntax executor 158 also updates the packet headers 68 of the old data packets 66 and the new data packets to indicate the conversions have been made. After the data has been translated into the appropriate syntax, the old data packets and the new data packets are returned to the control loop 156.

The context builder 160 is responsible for preparing printing instructions, or context instructions, that are received by the program control 42 from the server job controller for transmission to the printers 16a, 16b. The context builder 160 places the instructions into the appropriate form by reference to an internal database 161 and the global database 53. If a printing request is made without specific printing instructions, the context builder supplies default instructions defining how the printing request will be serviced. After the instructions are placed in the appropriate form, the old data packets 66 and the new data packets 66 are returned to the control loop 156, with their packet headers modified to indicate the preparation has been performed.

If the data packets 66 are transmitted to either the data syntax executor 158 or the instruction context builder 160, new data packets 66, which are empty, are transmitted along with the old data packets. The information the data syntax executor 158 or the instruction context builder 160 generate is inserted in the new data packets 66 and both the new data packets 66 and old data packets 66 are returned to the program control loop 156. The program control loop 156 will dispatch the new data packets to the driver 50. If the old data packet 66 is empty, only the new data packet will be dispatched to the driver 50, and the old data packet 66 will be destroyed. If the information in the old data packet 66 has not been completely processed, it will not be empty. In this situation another new data packet 66 will be created and the both the new and old data packet will be dispatched to either the data syntax executor 158 or the instruction context builder 160 to complete the processing of the information in the old data packet so it will be forwarded to the printer 16a, 16b in a form usable by it.

The driver 50 (FIG. 1) functions as an interface between the server job controller 10 and the printers 16a, 16b. The driver 50 accepts data from the program controller 42 and transmits it to the appropriate printer 16a or 16b over either the printer data link 30 or the printer control link 32 depending on whether the data contains printing data or printing instructions. The driver 50 receives status messages from the printers 16a and 16b over the printer status link 36, generates status blocks 78 that contain the status information, and forwards the status blocks 78 to the status collector 48 over the status collector post port 112.

The driver 50 receives fault messages from the printers 16a, 16b including resource faults. In response to receiving the fault messages, the driver 50 generates status blocks 78 that describe the faults and forwards them to the status collector 48 over the status collector post port 112.

When resources are sent to the printers 16a, 16b in response to a resource fault they are forwarded from the resource manager 44 over the driver resource port 110 to the driver 50. From the driver 50 the resource is sent to the appropriate printer 16a or 16b over the printer resource link 35 that extends therebetween.

Figure 6:
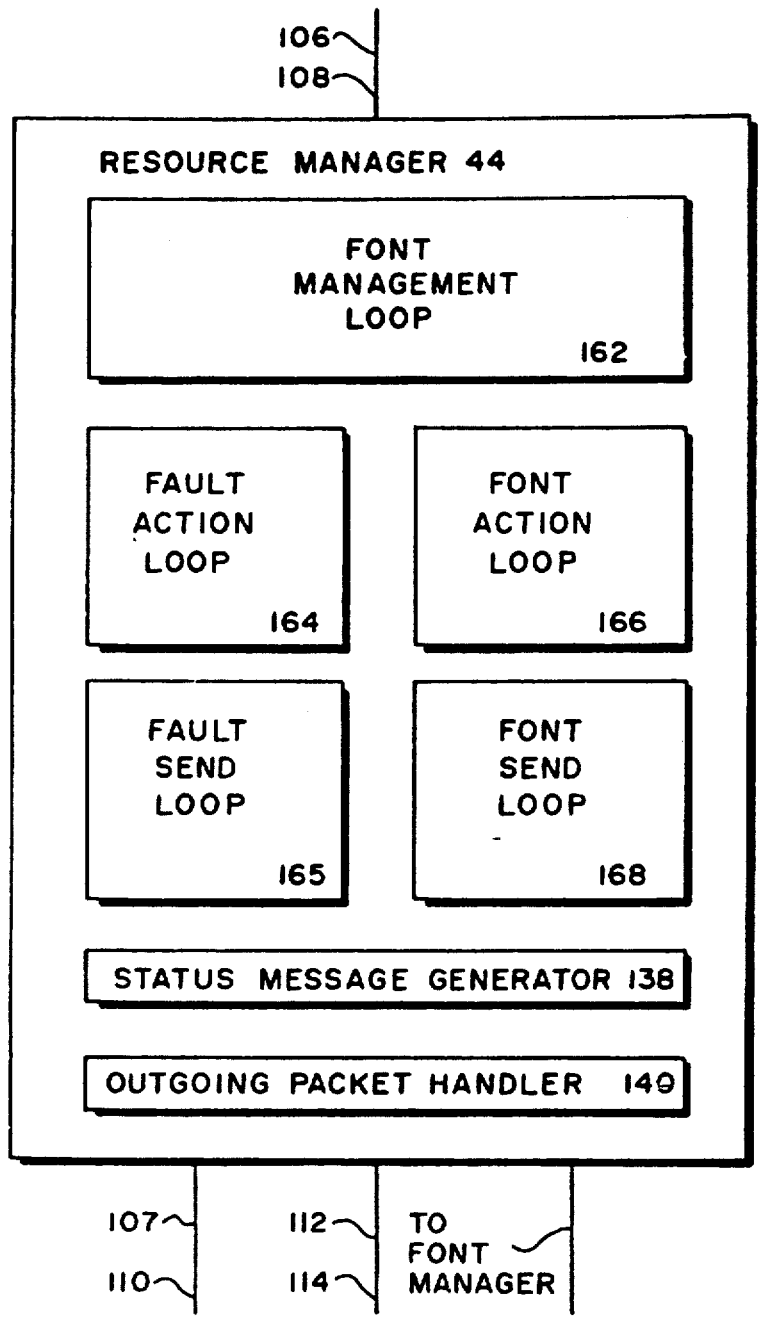
FIG. 6 is a diagram depicting the internal elements of a resource manager of the local area print server of this invention.

The resource manager 44, depicted in FIG. 6, directs the handling of resources requested by the printers 16a, 16b from the local area print server 10. A resource management loop 162 is the primary subsystem within the resource manager 44. The resource management loop 162 processes data packets 66 that are received by the resource manager 44 from the server job controller 40 and status blocks 78 received from the status collector 48. If the status block 78 contains a resource fault, it is forwarded to a fault action loop 164. If the data packet 66 contains resources, it is forwarded to a resource action loop 166.

The fault action loop 164 receives the resource fault from the printer 16a, 16b through the driver 50, the status collector 48 and the resource management loop 162 and references the font manager 45 to determine if the requested resource is locally available within the local area print server 10. If the requested resource is locally available, the fault action loop 164 arranges for the font manager 45 to forward the requested resource to the printer 16a or 16b through the driver 50. If the requested resource is not locally available, the fault action loop 164 forwards the resource fault to a fault send loop 165. The fault send loop 165 sends notice of the fault to either the server job controller 40 which attempts to have the printing client 18 provide the resource necessary to satisfy the fault, or directly to another network component, (i.e. the resource server 26,) through the network facility 38, via the external resource fault port 107, so the fault may be satisfied from that source. In either case if the attempt to obtain the resource from a remote source fails, the fault send loop 165 forwards notice of the unavailability of the requested resource to the status collector 48 over the status collector post port 112.

The resource action loop 166 reads the data packets 66 containing the requested resources from the resource management loop 162 until no more are available. The resource action loop 166 then forwards the resources to a resource send loop 168. The resource send loop 168 then forwards the data packets 66 containing the resources over driver resource port 110 and through driver 50 to the appropriate printer 16a or 16b.

Figure 7:
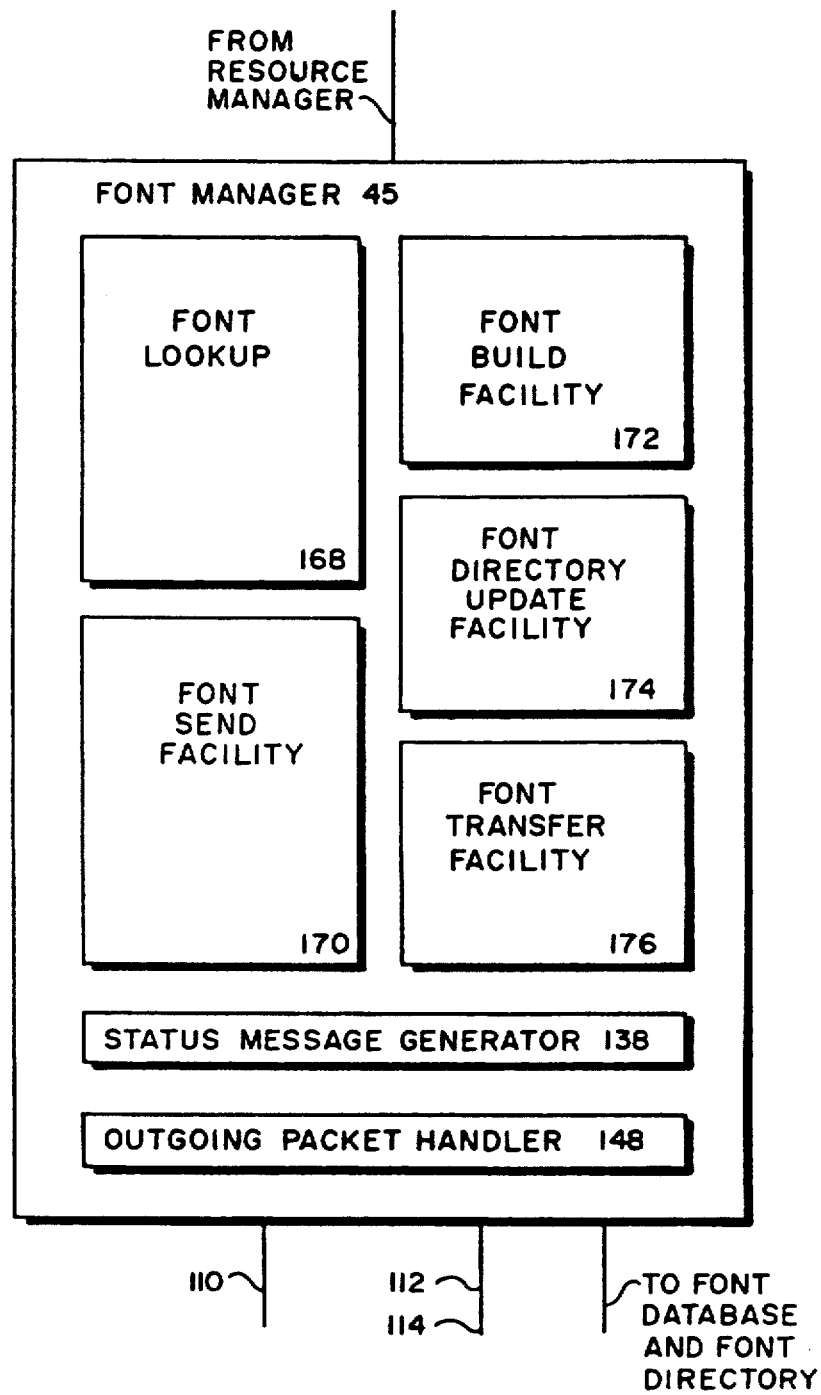
FIG. 7 is a diagram depicting the internal elements of a font manager of the local area print server of this invention.

The font manager 45, depicted in FIG. 7, serves as an interface between other server internal elements 38–50 and the font databases 58a, 58b and the font directory database 60. In most instances, the resource manager 44 and the system manager 46 are the two server internal modules that access the databases 58a, 58b, and 60. In response to queries regarding the availability of specific fonts, the font manager 45 has a font lookup 168 for reading from the font directory database 60 the location of a resource which may be in one of the font databases 58a, 58b or in one of the other network components 18–26. In response to a request for a specific resource, a font send facility 170 will send a resource from one of the font databases 58a, 58b to another server internal element 38–44, 46–50. If the resource is sent to the driver 50, it is sent over the driver resource port 110.

For example, if the resource manager 44 receives a resource fault indicating one of the printers needs a resource to satisfy a printing request currently being processed, the fault action loop 164 queries the font manager 45 to see if the resource is listed as available in the font database directory. If the resource is available, the fault action loop 164 directs the resource send facility 170 to forward the resource to the printer 16a or 16b through the driver 50 over the font work port 124.

The font manager is also provided with the capability to change or modify the availability of resources in the databases 58. Typically, the commands to so modify the resources is made by the system manager 46 in response to an instruction originating from one of the other network components 18–26. A font build facility 172 is provided to modify, add or delete resources in the local font database 58a. The font build facility 172 also makes the appropriate changes to the local font directory 60. A font directory update facility 174 copies the local font directory 60a onto the disk font directory 60b so the latter can be kept current. A font transfer facility 176 is available for moving resources between the local font database 58a and the disk font database 58b.

Figure 8:
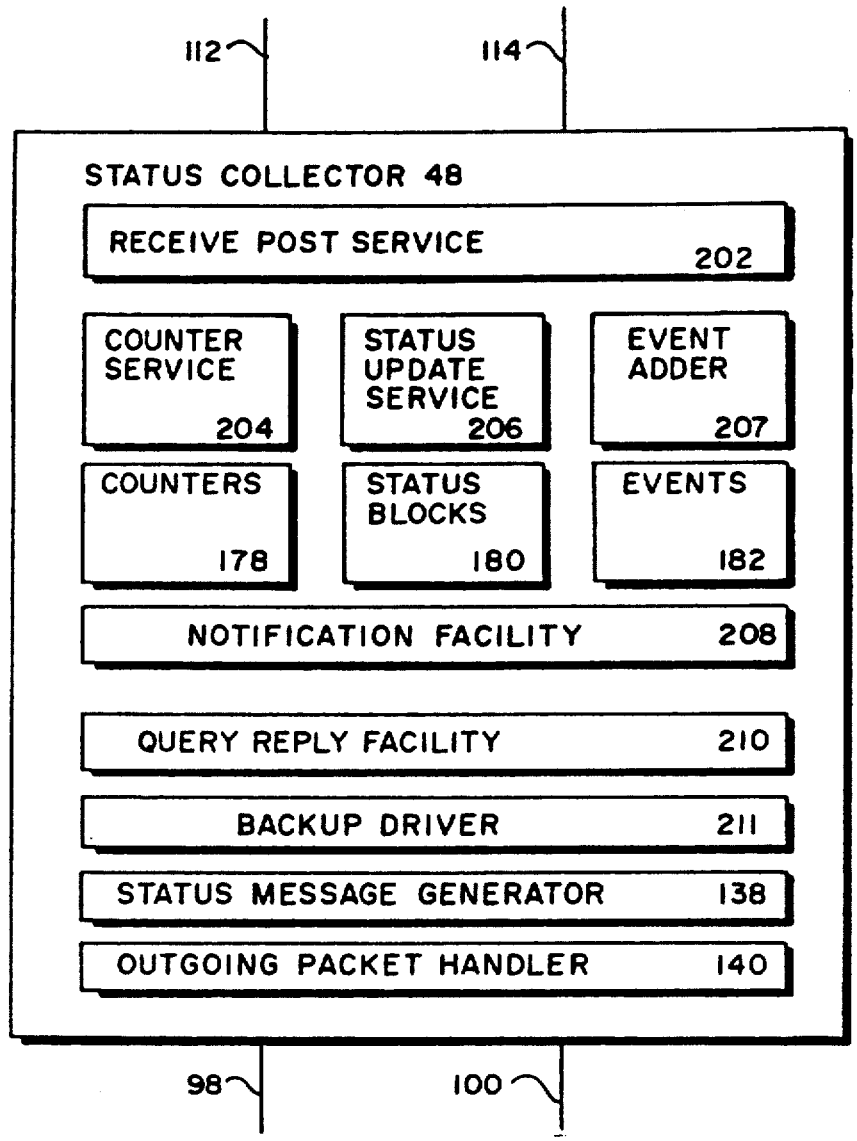
FIG. 8 is a block diagram depicting the internal elements of a status collector of the local area print server of this invention.

The status collector 48, depicted in FIG. 8, serves as a central collection point for all status changes and events that occur within the printing system 17. The status collector 48 receives notification of these events and status changes in the form of status blocks 78 over the status collector post port 112. The status collector 48 maintains three types of information; namely, counters 178, status blocks 180, and event lists 182. Counters 178 are integer values that quantify the occurrence of specific events that repeatedly occur in the printing system 17.

Figure 8A:
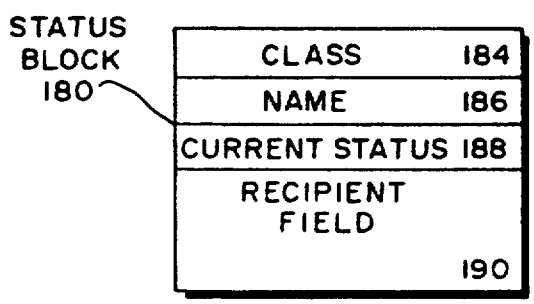
FIG. 8a is a diagram depicting the structure of a status block maintained by a status collector of the local area print server of this invention to contain information regarding the status of a portion of the local area print server or a printer that it is connected thereto.

The status block 180 comprising a collection of fields that hold status information for a specific condition of some portion of the print server, each state being a specific condition of some portion of the printing system 17. For example, status blocks 180 may indicate the current status, on-line or off-line, for each of the printers 16. FIG. 8a depicts the format of a status block 180 maintained by the status collector 48. A status block 180 includes a class field 184 for identifying a class identification of the state mentioned, a name field 186 for identifying the specific state monitored, a current status field 188 which contains the current status of the state, and a recipient field 190. The recipient field 190 identifies what entities, (i.e. printer console 51 or event logger that is part of the network,) should be notified of state changes on behalf of that particular entity.

Figure 8B:
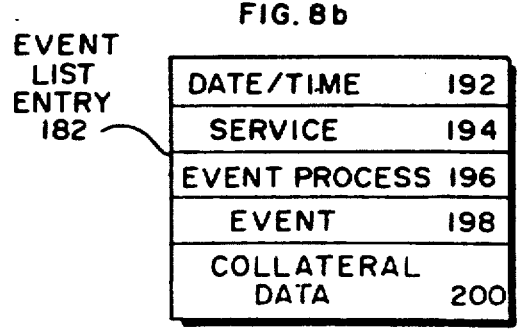

The event lists 182 are lists, depicted in FIG. 8b, of activities occurring within the local area print server 10 and the printers 16a and 16b for events that are tracked by the status collector 48 during the servicing of a specific printing request. The event lists 182 comprise a plurality of entries with each entry 183 associated with one event and includes a date and time field 192 which is filled in by the status collector 48, a service of priority field 194 which indicates the event's importance, an event process field 196 whose contents identify the portion of the printing system 17 causing the event, an event field 198 whose contents identify the actual event, and collateral data field 200 which may contain other information about the event.

The counters 178 and status blocks 180 may be created and destroyed by the status collector 48 as the need for their particular use arises and is satisfied. The event lists 182 are started and added to as the associated events are tracked. After particular types of events, for example a specific printing request, are completed, the associated event list entries 183 may be destroyed.

A receive post service 202 accepts status blocks 78 from the status collector post port 112 and, depending on their contents, forwards them to either a counter service 204, a status update service 206 or an event adder 207. If a status block 78 contains update information regarding a quantitative state 178, it is forwarded to the counter service 204 so the value of the appropriate counter can be adjusted. If a status block 78 contains update information regarding the state status maintained by status collector 48, it is forwarded to the status update service 206 which revises the appropriate status block 180. If a status block 78 contains information about an activity the status collector is tracking, the receive port service 202 forwards the information contained in the data packet to the event adder 206. The event adder 206 then generates an event entry 183 and appends it to the appropriate event list 182.

A notification facility 208 sends reports of printing system 17 status changes or events to appropriate network 12 components internal and external to the local area print server 10 that would have an interest in knowing them. Which component receives an indication of a particular status change or event is determined by reference to the information in the status block notify field 83 and the information in the status block recipient field 190. The notification facility 208 has a notification initialization facility 209 which, upon receipt of commands from the other server internal modules 38-46, 50, set the status block recipient field 190 to be associated with a recipient to indicate which print server component, for example the server job controller 40 or the system manager 46, should be notified when specified status blocks are updated. Thus, regardless of the information contained in the status block notify field 83, whenever a status block 180 is updated, the notification facility 208 checks its recipient field 190 to determine if the server job controller 40 or the system manager 46 is to be notified and forwards a status block 78 indicating the change to the designated internal modules.

The notification facility's reports of printing system 17 status changes are in the form of status blocks 78 that are retransmitted from the status collector to the server internal module 38-46 and 50 or network 12 component designated to receive the report.

For example, if one of the printers transmits a status block 78 indicating that it has completed the servicing of a particular printing request, the status block 78 reporting the servicing of the printing request will be transmitted to the server job controller 40 over the server job controller notify port 98. Then, as previously discussed, the server job controller 40 informs the current printing client 18a, 18b that its printing request has been served, and then arranges servicing of the next printing request. Depending on whether or not the completion of printing requests is monitored by the system manager 46, the status block 78 may also be transmitted to the system manager over the system manager notify port. If a status block contains notice of a resource fault, it will be retransmitted to the resource manager 44 over the resource manager fault port 106. If a status block 78 from one of the printers 16 contains an indication the printer needs operator attention, the status block may be transferred to the server job controller 40 so it is aware the printer is off-line and cannot service printing requests and to the system manager 46 for further retransmission to selected operator consoles 20 and the printer console 51. Moreover, status blocks 78 forwarded to the server job controller 40 may also be sent to the active printing clients 18a, 18b if the contents may be of interest to the user or the operator on the client system.

A query reply facility 210 receives queries over the status query report port 114 made by the other server internal modules 38-46 and 50. For example, the service manager 22 may make a query through the network facility 38 and the system manager 46 regarding the on-line/off-line status of one of the printers 16. The query reply facility 210 builds a reply to the query from the information in the counters 178, status blocks 180 and event lists 182. After the reply is constructed, it is transmitted to the inquiring server internal processor 38-46, 50 over the status query port 114.

The status collector 48 has a backup driver 211 which periodically copies the counters 178, status blocks 180, and event lists 182 onto a disk (not shown) for permanent storage. The disk may be internal to the local area print server 10 or external to it, such as on one of the other network components 18-46. The status collector status message generator 138 generates status messages that the status collector 48 can process internally.

Figure 9:
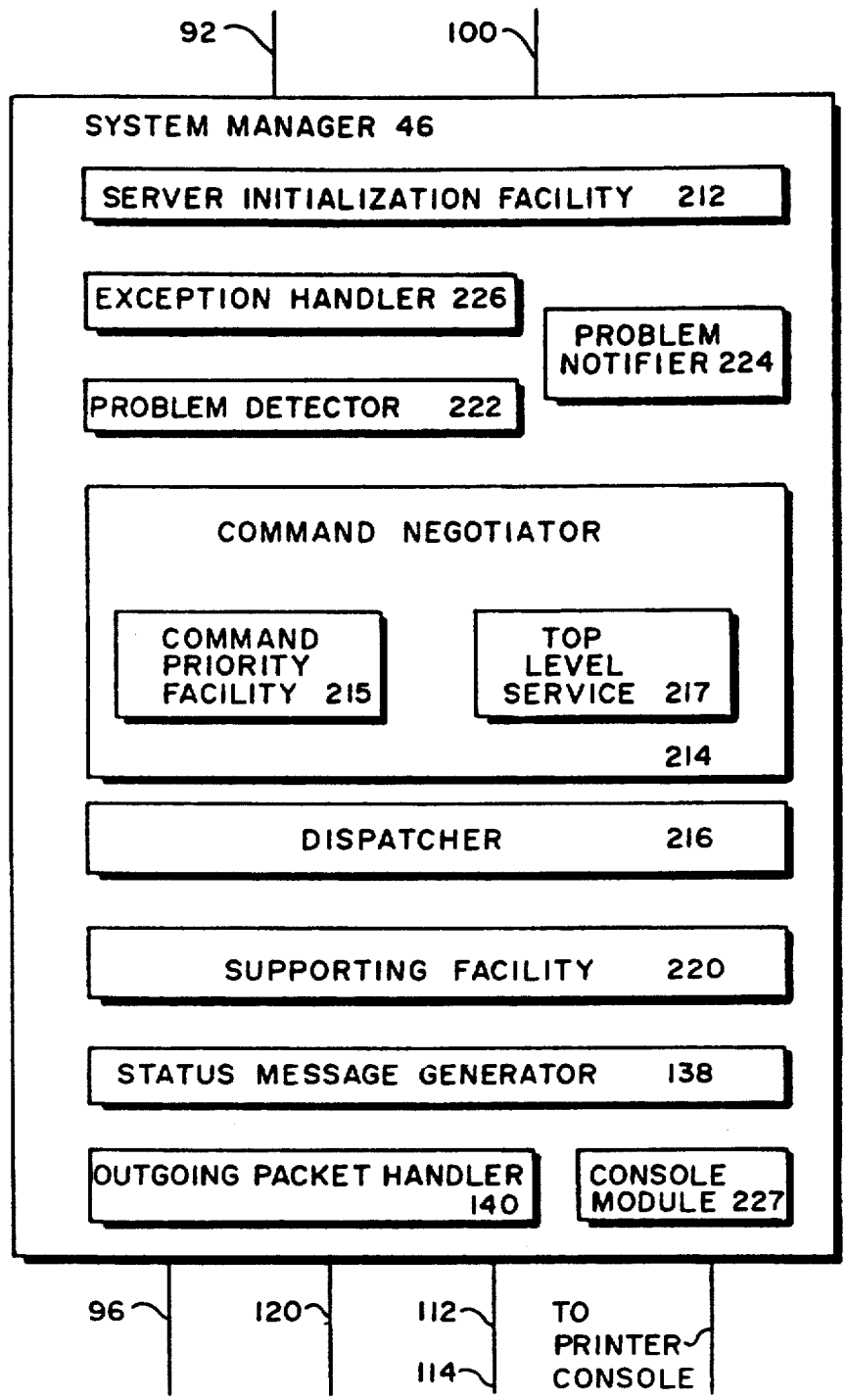
FIG. 9 is a diagram depicting the internal elements of a system manager of the local area print server of this invention.

The system manager 46, depicted in FIG. 9, functions as the command interface between the printing system 17 and the other network components 18-26. The system manager 46 receives and responds to all commands and queries that are transmitted to the printing system, except for printing requests. For example, the system manager 46 receives and responds to commands to add and delete printing clients, to add, delete and change resources, to rearrange the priority in which printing requests are served, or to cancel specific printing requests entirely, to change the default parameters by which printing requests without specific instructions are serviced, to change the basic parameters, such as maximum page length, under which printing requests are serviced, to change the context instructions by which printing requests are serviced, and it also responds to status queries directed to the printing system 17. The system manager 46 monitors activities that occurs within the printing system 17 and responds accordingly to those events. The system manager 46 is also responsible for initializing the local area print server 10.

The system manager 46 has a server initialization facility 212 that initializes the local area print server 10. The server initialization facility 212 begins its initialization process in response to the initial power-up of the local area print server 10 or an external boot (initialization) command from another network component 18-26. As part of the initialization process, the server initialization facility 212 transfers configuration data and client data into the global database 53, initializes the server job controller 40, the resource manager 44, the font manager 45 and the status collector 48, directs the status collector 48 to initialize its counters 178, status 180 and event lists 182, and transfers an announcement message over the bus 14 of the availability of the printing system 17.

The system manager 46 has a command negotiator 214 that receives and interprets commands from other network components 18-26 and, in turn, generates data packets 66 that contain commands for the other server internal modules 38-46 and 50 to execute. The command negotiator 214 initially responds to the commands and queries to the local area print server 10 by calling the appropriate routines in a dispatcher 216, as will be discussed hereafter. The command negotiator 214 processes commands sequentially from the network components 18-26 on a first come first-served basis.

The command negotiator 214 distinguishes between privileged and non-privileged users of the system manager 46. Privileged users are network components such as the operator controlled operator console 20 or the service manager 22 that control how the printing system 17 services printing requests. Privileged users can add or delete printing clients 18 that may use the printing system 17, rearrange the order in which pending printing requests are served, add or delete fonts, and set default parameters. Non-privileged users include such network components as the printing clients 18a and 18b. Non-privileged users can only make queries with regards to events such as the status of the printing system; the status of pending printing requests; and the default parameters applied to printing requests.

To distinguish between a privileged and non-privileged user, the command negotiator 214 has a top level service 217 that checks each incoming command. Incoming commands from privileged users include a password. If the user-supplied password is identical to the one maintained by the top level service 218, the command is executed. If the passwords are not identical, the command is not executed and its sender receives an appropriate message.

The dispatcher 216 executes the routines invoked by the command negotiator 214 when a command is to be processed. The dispatcher 216 assembles data needed to perform specific commands. The dispatcher performs its functions by reference to a supporting facility 220 that contains a common set of supporting routines The system manager includes a problem detector 222 for responding to print system conditions that require either operator or service manager 22 attention. The problem detector 222 receives notification of conditions requiring operator attention from the status collector 48 over the system manager notify port 100. If a status message indicates a condition in printing system 17 requiring attention by either an operator or another network component 18-26, the problem detector 222 generates an appropriate message for transmission to one or more of the other network components 18-26, usually the operator console 20 or the service manager 22. The message is transmitted to the appropriate network component by a problem notifier 224.

An exception handler 226 responds to all conditions, events and messages that cannot be processed by the other portions of the system manager 46. Whenever such a situation occurs that exception handler 226 suspends all print station 17 processes except system management and status collection. It saves, or orders saved, the current information being processed, the global database, and the information stored in the global database, and the most current information from the printers 16a, 16b stored in the driver 50. The exception handler 226 then generates a message for one more of the other network components 18-26, identifies the problem and offers remedial option. The message generated by the exception handler 226 is forwarded to the appropriate other network components 18-26 by the problem notifier 224.

If the local area print server 10 is provided with a printer console 51, the system manager 46 is provided with a console module 227 that serves as the interface between the printer console 51 and the printing system 17. The console module 227 forwards commands and queries to the printing system 17 made through the printer console 51 to the appropriate destination for action, and forwards to the printer console 51 status reports, response to queries, and other relevant information that should be displayed there.

Structure of the Printing Client

Figure 10:
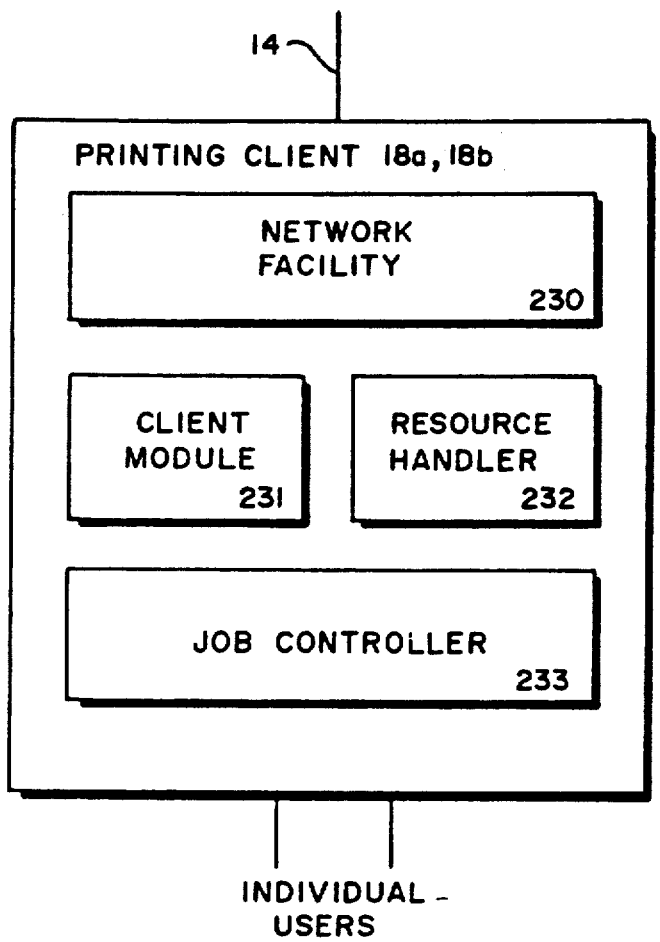
FIG. 10 is a diagram depicting the internal processor elements of a printing client that uses a printing system which includes the local area print server of this invention.

FIG. 10 depicts the internal elements the printing clients 18a, 18b use to exchange information, including printing requests, with the local area print server 10. In an environment where the printing client 18a, 18b comprises a number of individual processors configured as a single host supporting a number of users, this structure defines the elements of the host that are used to exchange information over the bus 14 with the local area print server 10. Since the file server 22 and the resource server 24 also exchange information with the local area print server 10, they have internal elements similar to those of the printing clients 18a and 18b.

A printing client 18 has a network facility 230 which functions as an interface to the other components of the network 12 over the bus 14. The printing client network facility 230 performs functions similar to the server network facility 38, namely, it establishes virtual circuits to enable communication between the network components 17-26. After establishing a virtual circuit connecting to the local area print server 10, the network facility 230 points incoming messages to the appropriate destination within the printing client 18 or directs outgoing messages over the appropriate virtual circuit. If the messages relate to a printing request serviced by printing system, it is forwarded to a client module 231 or a resource handler 232.

The client module 231 encodes and decodes print server protocol messages transmitted between the printing system 17 and the individual users that access its services. Through the printing client network facility 230, the client module 231 initiates and terminates connections to the printing system 17, sends information to the printing system, sets print attributes and context for printing requests, and obtains the current status of the printing system 17.

The resource handler 232 is responsible for transferring files to the printing system 17. The resource handler 232 first receives a file name and printer context instructions from the user that wants the contents of the file printed, it then transfers the named file, a buffer at a time, to the printing system. The resource handler 232 also responds to resource fault messages from the local area print server 10 by locating the requested resource and forwarding it to the printing system 17. If the printing system 17 goes off-line, the resource handler 232, is so notified by the system manager 40 through the network facility 38 and, in turn, invokes a notification routine so the printing clients 18 and users are made aware of the status of the printing system 17.

A job controller 233 is the top layer of the print server interface. The job controller 233 communicates with the individual users of the printing system 17, the individual processors, and packages their printing requests for servicing. Upon receiving a printing request from a user, the job controller 233 makes a printing request message which is transmitted to the local area print station after the printing client network facility 230 and client module 231 have succeeded in opening a connection thereto. The job controller 233 then uses the resource handler 232 to send the printer request printing data and printing instructions to the printing system 17.

LOCAL PRINT SERVER PROTOCOL

The local area print server 10 uses a local print server protocol to exchange information and commands with other network components 18-26. This protocol is used by the other network components 18-26 to make printing requests, transmit printing data, printing instructions and resources and make queries regarding printing requests to the printing system 17. The printing system 17 uses the local print server protocol to notify the other network components it is ready to accept printing requests, the type of services, including fonts, it has available, the status of printing requests made, that it has completed a printing request, that it needs a particular font to satisfy a printing request, or that it needs operator attention.

Figures 11, 12:
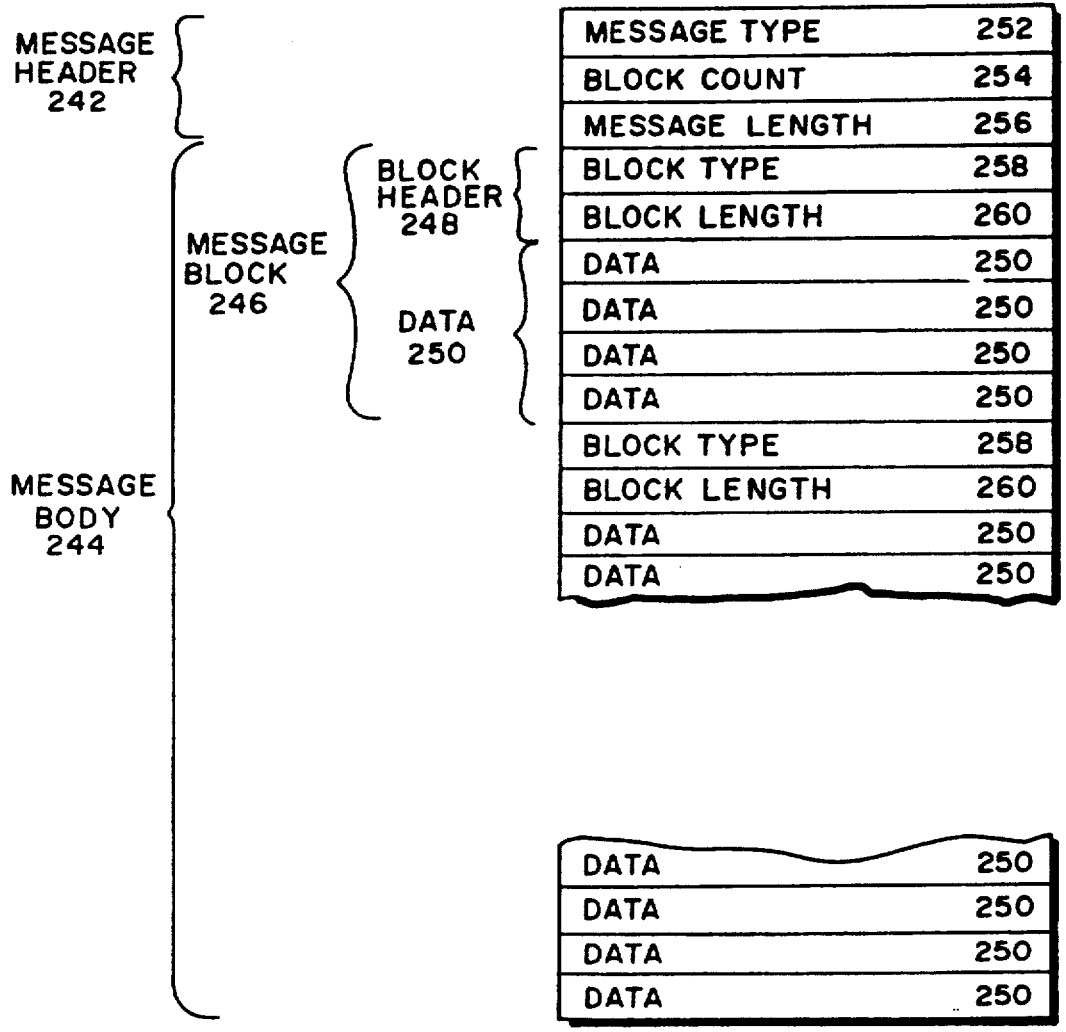
FIG. 11 is a diagram depicting the structure of information sent between the local area print server and the other digital data processing system components in accordance with the local print server protocol.
FIG. 12 is a diagram depicting the structure of server message sent to the local area print server from the other components of the data processing system components in accordance with the server manager external protocol.

FIG. 11 depicts the format of information transferred over the bus 14 between the local area print server 10 and the other network components 18-26 in accordance with the local print server protocol. The information is transmitted in the form of a LAPS message 240, which is transmitted between the network facility 38 of the local area print server and complementary network facilities in the other network components 18-26. Each LAPS message 240 includes a message header 242 and a message body 244. Each message body includes one or more message blocks 246, with each block comprising a block header 248 followed by one or more data blocks 250.

The message header 242 consists of a message type field 252, a block count field 254 and a message length field 256. The message type field 252 identifies the type of protocol message being sent. The block count field 254 identifies the number of message blocks 246 that are in the message The message length field 256 indicates the length of the message body 244.

The block header consists of a block type field 258 and a block length field 260. The block type field 258 identifies what type of data is passed. The block length field 260 indicates the length of the data block 250.

There are seven types of LAPS messages 240 that may be transferred between the local area print server 10 and the other network components 18-26. CONNECT, DATA, CONTROL, END-OF-JOB and RESOURCE-STATUS messages are transmitted by the other network components to the local area print server 10. STATUS and RESOURCE FAULT messages are transmitted by the local area print server 10 to the other network components 18-26. The specific type of individual LAPS message 240 is indicated by the contents of the message type field 252.

In brief, the CONNECT message is used to establish a logical connection to the local area print server 10. The DATA message is used to forward printing and resource data to the printers 16a, 16b. The CONTROL message may be used to set and change the parameters by which the printing system operates. The END-OF-JOB message is used to signal the end of processing that is associated with a particular printing request. The RESOURCE-STATUS message is used to inform the local area print server of the availability of a requested resource.

The STATUS message is used by the local area print server 10 to inform network components 18-26 of the status of the printing system 17. RESOURCE-FAULT message is used by the local area print server 10 to indicate that it needs a resource in order to service a printing request Each type of LAPS message 240 contains at least one message or command within the message body 244. Each such message or command is contained within an individual message block 246. The specific message or command contained within a message block 246 is indicated by the contents of the block type field 256. The specific information associated with the message or command is represented by the value of the data block 250.

More specifically, the CONNECT message is used to establish a connection to the local area print server 10. The CONNECT message comprises information including the virtual circuit identity of the other network component 18-26 desiring the connection, and the highest and lowest version of the local area print server protocol it can communicate with. The CONNECT message may also contain information including the identity of the printer 16a or 16b to be used to service a printing request, the syntax of the data sent from the printing user to the printing client or from the printing client to the local area print server 10, or the language of the person operating the network 12 or to receive the printed output the document.

The DATA message is used to transmit bulk data to the local area print server. The bulk data may comprise print or control data which is the object of the printing request, or resource data which is used to satisfy a resource fault associated with a printing request. The DATA message may include a message indicating the type of data being sent, that is, whether the data is print, control or resource data, the actual data being sent, and one or more message flags.

One type of message flag is an END-OF-DATA DATA message which indicates the end of that particular stream of DATA messages being sent. The local area print server 10 acknowledges successful receipt of the END-OF-DATA DATA message, with an appropriate STATUS message.

The CONTROL message is used to set parameters for a printing request and to provide control information to the printers 16a and 16b. The CONTROL message may specify a command the local area print server 10 should perform, such as terminating the specified printing request. Alternatively the CONTROL message may contain control information for the printers 16a, 16b, or specify the resource server that may be used to satisfy resource faults.

The last message block 246 of a CONTROL message includes the block type field 258, whose contents indicate that block 246 contains a print server job identifier, and a data block 250 which contains the print server job identifier.

The END-OF-JOB message signals that the printing client 18a or 18b has completed the printing request and is releasing the printing system 17 for the next printing request. Typically an END-OF-JOB message is sent when the printing client 18a or 18b has received a STATUS message indicating the printing system 17 has successfully printed the contents of the printing request sent to it, and there is no additional material associated with that printing request to be printed. Alternatively, an END-OF-JOB message may also be sent by the printing client 18a or 18b in response to a STATUS message from the printing system 17 indicating that servicing of a printing request is being terminated. The END-OF-JOB message may include information indicating if the printing request was terminated normally as a result of the printing request being satisfactorily serviced, or abnormally, such as due to an immediate printing client or user command. The END-OF-JOB message can also include accounting information relevant to the terminated printing request or additional information about why a printing request was abnormally terminated. After the printing system 17 receives an END-OF-JOB message, it transmits a STATUS message indicating it has completed all processing associated with the printing request and that it is available to service another printing request.

The STATUS message is sent by the local area print server 10 to inform the printing clients 18a and 18b of the current status of a printing requests they have submitted for service. An ACCEPTED STATUS message is sent when the printing system 17 is ready to start servicing a printing request and the printing client 18a and 18b may start sending the necessary data streams. A PENDING STATUS message is sent when the printing system 17 has accepted the printing request but is not yet ready to service it or accept the necessary data streams. The printing client 18a, 18b may forward the necessary printing data and printing instructions when it receives an ACCEPTED STATUS message. A STATUS COMPLETED message is sent after a data stream has been completely forwarded to the local area print server, forwarded to the local area print server 10, as indicated by an END-OF-DATA message included therein, and the data stream has been processed by the local area print server 10. A RELEASED STATUS message is sent after the local area print server 10 has received an END-OF-JOB message from the printing client 18a, 18b and the print station has completed all the processing necessary to service a job.

There are also STATUS messages to indicate the rejection of printing requests due to print server protocol incompatibility, the printing client 18a, 18b being an unauthorized user of the print system 17, or other reasons. Other STATUS messages may be sent to indicate the inability to service a printing request due to events such as internal printing system 17 faults, protocol errors during the servicing of the printing request, or the resources available are insufficient to service the request. Still other STATUS messages may be used to control the flow of information streams containing the printing data, printing instructions and resources from the other network components 18-26 to the local area print server 10 and indicate its acceptance thereby.

A STATUS message may also be used to supply information regarding the operational status of the printers 16a and 16b, the range of protocol the local area print server can operate under, the print server protocol it will operate under for the specific printing connection, or accounting information for a particular job.

In some instances, a STATUS message will include a block 246 that contains a job identifier which identifies a specific printing request which has been established by the local area print server 10 when it initially receives the printing request. The job identifier is included in many STATUS messages including ACCEPTED, PENDING, COMPLETED and RELEASED. The job identifier is also used by the printing clients 18a and 18b when they send CONTROL messages and there is a need to identify the printing request the message is directed to.

The RESOURCE-FAULT message is used by the local area print server to inform the resource server of a resource request. The RESOURCE-FAULT message includes message blocks 246 which contain information describing the specific resource required including the type of resource, specific attributes which may effect the choice of a particular resource, and variances which may be allowable, in situations where and exact match is not found for the desired resource.

The RESOURCE-STATUS message is used by the resource server 20 to inform the local area print server 10 of the availability of the requested resource. The RESOURCE-STATUS message contains information including the current availability of the requested resource and the range of print server protocols the resource server can operate under and the one it will operate under for this connection. The RESOURCE-STATUS message may also contain information regarding the availability of substitute resources if the requested resource is not available. The substitute resource information will include either a specific descriptions of the substitute resource or a specific description of where the substitute resource can be found.

SERVER MANAGER EXTERNAL PROTOCOL

The local area print server 10 uses a server management external protocol to exchange information and commands with other network components 18-26 relating to the operation of the printing system 17. The server management external protocol is unlike the local print server message protocol in that it is not used to make printing requests, transfer information which is used to service the printing requests, or inform the printing clients of the status of the printing requests. The server management external protocol is used to forward commands and make queries regarding how the printing system serves the printing requests. For instance, the server management external protocol is used by network components including the operator console 20 and the service manager 22 to select the pending printing request that should be serviced next, delete printing requests, add or delete printing clients authorized to use the local area print server, and change the parameters by which individual printing requests are serviced, and the default parameters by which printing requests without explicit instructions are serviced. The local area print server 10 uses the server management external protocol to respond to queries about conditions within the printing system, such as the status of pending printing requests, and to inform other network components of the condition of the printing system 17, such as when the printers 16a, 16b need attention. Depending on the particular implementation of the server management external protocol, it may be part of a broader management protocol used to monitor and control all the systems, host and servers both, that are part of the network 12.

FIG. 12 depicts a server message 280, the format of information transferred over the bus 14 between the local area print server 10 and other network components in accordance with the server management external protocol. In this particular implementation, the server message 280 is a standard management message and is used to send commands and queries not only to the printing system 17, but to other systems that are part of the network 12. The service message 280 contains a verb field 282, an entity field 284, an attributes field 286 and, in some instances, one or more attribute value fields 288.

The verb field 282 describes the particular operation to be performed. Operations that may be performed include initializing the printing system 17, loading the configuration database 56, displaying queued printing requests, adding or deleting printing clients, aborting printing jobs, changing printer default context instructions, and adding or deleting material to the server databases 52-62.

The entity field 284 identifies the particular printing system 17 component the server message 280 is directed to. Service messages 280 directed to the printing system 17 all contain a common statement in the entity field 284 that the message 280 is so directed. If is more than one printing system 17 attached to the network, than the entity field 284 should contain a statement indicating which printing system 17 the particular service message it is part of is directed to.

The attribute field 286 describes the object of the verb field. For instance, if the verb field 282 is SHOW, the attribute field 286 would be QUEUED-JOBS if the service message is a query regarding printing requests awaiting servicing; ACTIVE-JOBS if it is a query regarding the job currently being processed by the printing system 17; or CHARACTERISTICS if a query regarding the capabilities and default printing instructions of the printing system. If the verb field 282 is SET the attribute field 286 would be INPUT-PAPER-TRAY if that default context instruction was being set, or PASSWORD if a new password was being set.

The attribute value fields 288 contain the values associated with a particular attribute of a server message 280. For instance, if a particular server message 280 is a command to abort a specific printing request, the verb field 282 is ABORT to indicate the activity, the entity field 284 is set to PRINTSERVER to indicate the message is directed to the local area print server 10, the attribute field 286 is set to JOB to indicate a printing request is to be aborted, and the attribute value field 288 contains the server job identification number of the printing request to be aborted. If a particular server message 280 is a change of passwords for the privileged access to the printing system 17, the verb field 282 is SET to indicate the activity, the entity field 284 is set to PRINTSERVER to indicate the message is directed to the local area print server 10, the attribute field 284 is PASSWORD to indicate the password of the printing system is being set, the first attribute field 288 is the old password to indicate the command is being made by a user authorized to make it, followed by a second attribute value field 288 containing the new password, followed by a third attribute value field 288 containing a verification of the new password.

The local area print server 10 will send a response to a server message 280 in any format well known in the art. If the server message 280 was a query to the printing system 17, the response will contain a reply to the query, if the service message was a command to the printing system 17, the response will contain an indication of whether or not the command was executed.

DESCRIPTION OF THE PROCESS IN OF A PRINTING REQUEST

Figure 13:
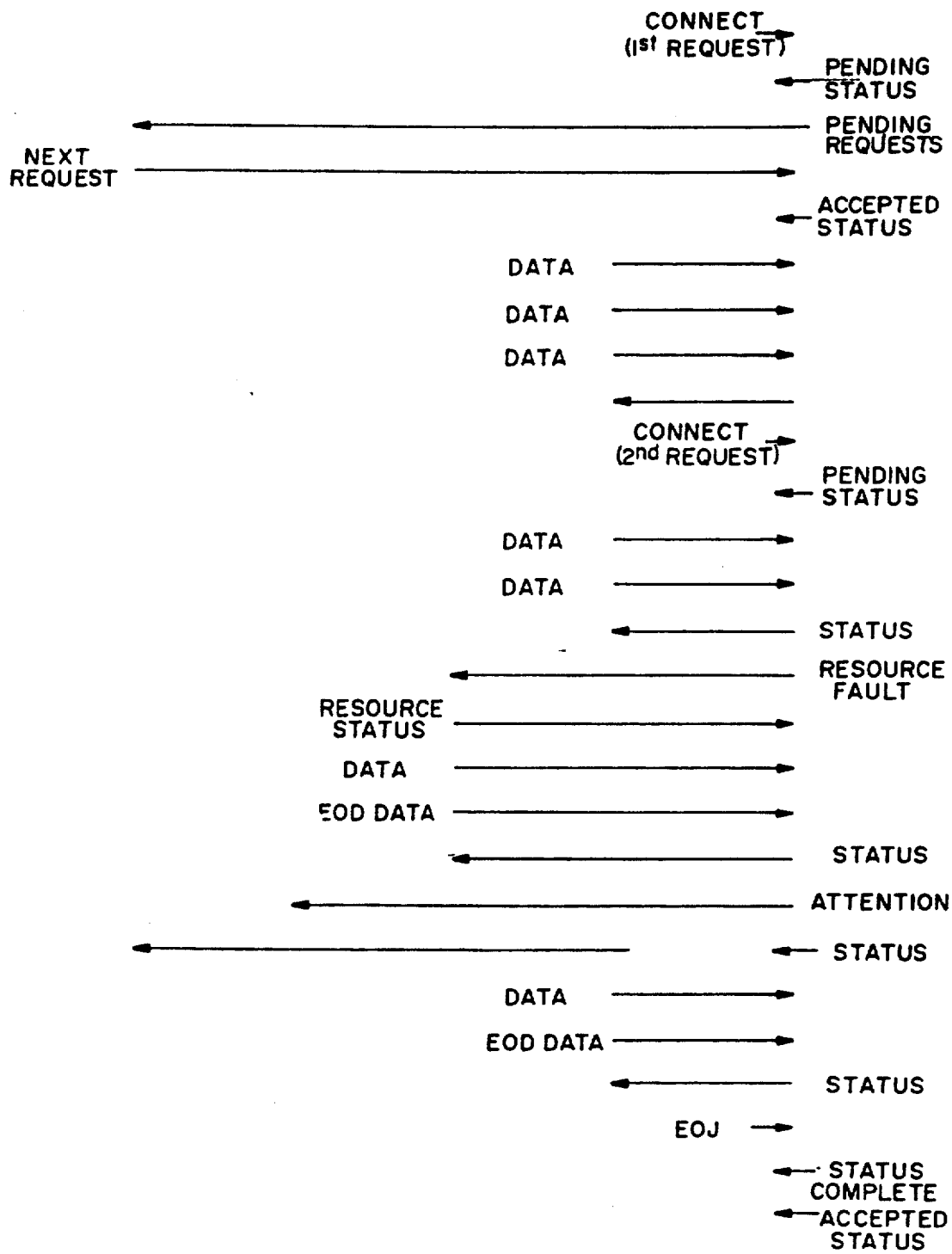
FIG. 13 depicts a sequence of print server protocol messages transmitted between the local area print server and the other digital data processing system components in order to service a printing request.

FIG. 13 depicts the LAPS messages 240 and the server management messages 280 that are transmitted between the printing system 17 and the other network components 18-26 during the servicing of a printing request. After initialization by the initialization facility 212 of the system manager 46, the local area print server is able to accept printing requests. A printing client makes a printing request by transmitting a CONNECT message. After the local area print server 10 and the printing client 18a, 18b verify they are using compatible versions of the protocol, the local area print server 10 may then transmit a PENDING STATUS message indicating that the printing request has been accepted but the print station 17 is currently unable to process it. At this time, the printing clients 18 may transfer the contents of the printing request, including the printing data and printing instructions, to a file server 24, and/or perform additional processing duties until it receives an ACCEPTED STATUS message.

While the printing request is pending, the service manager 22 may request a list of queued printing requests from the local area print server 10 by sending a SHOW QUEUED-JOBS message. Upon review of the pending printing requests, the service manager 22 may decide this particular printing request should have top priority and send a SET NEXT-JOB message to the local area print server 10 indicating this printing request should have top priority.

When the printing system 17 is available to service a new printing request it will transmit an ACCEPTED STATUS message to the printing clients 18 to indicate it is ready to accept the data streams necessary to service this printing request. The printing clients 18, or the file server 24 under its direction, then forwards DATA messages containing the information needed to satisfy the printing request. Alternatively, the printing client 18a, 18b will forward the local area print server 10 a message indicating the location of the information, such as where it is stored in the file server 24 (exchange not illustrated). The local area print server 10, usually the server job controller 40, will then activate a routine, known in the art, to retrieve the information itself. The printing information transmitted to the local area print server 10 is then forwarded over the bus 14 through the local area print server 10 to the appropriate printer 16a or 16b.

The forwarding of DATA messages to the printing system 17 may be temporarily blocked by the network facility 38 while the local area print server 10 responds to a new CONNECT message for the servicing of a second printing request. The blocking of DATA messages is done by the server job controller control loop 142 which is set to give CONNECT messages a higher priority than DATA messages. Since the printing system 17 is currently servicing the first print request, the local print server will store the second printing request and acknowledge it with a PENDING STATUS message. The local area print server 10 will then unblock the flow of DATA messages for the first printing request.

While the printer 16a or 16b is receiving and processing the printing data and the printing instructions, it may become aware of the need for a resource it does not have locally available to satisfy the printing request. The printer will then inform the resource manager 44 of the need for the resource through the driver 50 and the status collector 48 as described. During this period the printing system 17 will not accept DATA messages. The resource manager will search the font databases 58a, 58b through the font manager 45 in order to see if the resource can be supplied locally from within the local area print server 10. If the needed resource cannot be so supplied the resource manager 44 informs the server job controller 40 of the resource fault through the status collector 48.

In response to the resource fault, the server job controller 40 transmits a RESOURCE-FAULT message to the resource server 26 able to satisfy the fault. The resource server 26 initially sends a RESOURCE-STATUS message indicating the availability of the requested resource. If the resource is available, the resource server then sends DATA messages containing the resource. The resource data is sent through the network facility 38, the server job controller 40, the resource manager 44 and the driver 50 to the printer 16. When the resource server 20 finishes sending the resources, it sends an END-OF-DATA DATA message to the local area print server 10. The local area print server 10 responds with a STATUS$ message indicating the acceptance of the resource. After the resource has been accepted, the server job controller unblocks the initial transmission of DATA messages from the printing client or file server.

If during the actual generation of printed material a printer 16a or 16b needs attention, because, for example, the paper supply has been exhausted, an appropriate status message is transmitted from the printer through the driver 40 to the status collector 48. The status collector 48 will then generate one or more status messages for forwarding to the operator monitored operator console 20, the printing client 18a, 18b and the system manager 46 for display on the server console 51. After the condition requiring attention is satisfied, the printer will inform the system manager that it is again able to operate. During the period the printer 16a, 16b is inoperable, the server job controller 40 may still be able to accept data for the printing request being served. However, it would inform other network components of the current, inoperable, state of the printer 16a, 16b.

When the printing client 18a, 18b or file server 24 completes the transmission of one set of DATA messages needed for the printing request, an END-OF-DATA DATA message is sent. When the print station 17 has completed the processing of the data of the just sent DATA messages, it sends a STATUS message indicating the successful completion of such processing. If there is no more data needed for that printing request, the printing client 18a, 18b transmits an END-OF-JOB message to the local area print station 10. After the printing system 17 has completed the servicing of the printing request, the local area print server sends a RELEASED STATUS$ message indicating the printing request has been completely serviced. The local area print server is then able to send an ACCEPTED STATUS message to the printing client 18a, 18b with the next printing request to be serviced.

There are a number of advantages to the local area print server 10 of this invention as the link between printers 16a, 16b and the network 12 they are used with. The local area print server 10 is able to accept a number of printing requests 10, even while servicing one request, store them, and service them in accordance with their priority. When a printing client's printing request cannot be immediately satisfied, the printing client at least receives a PENDING STATUS message acknowledging the receipt of the printing request. This eliminates the back-up some printing clients 18a, 18b experience while they wait for their printing requests to be serviced since the pending status message frees them for additional processing duties until they receive notification that the printed system can service the printing request.

Load balancing of printing requests can be achieved if more than one printer 16 is attached to each local area print server 10. This is possible because the local area print server 10 can distribute the printing requests by distributing among the printers connected thereto. This avoids the situation where one printer has a number of printing requests in its queue for processing while an adjacent printer stands idle.

Furthermore, if a particular local area print server 10 is unable to service a particular printing request, or is unable to service it immediately, the printing client 18a, 18b, is so notified. In a system with multiple local area print servers 10, the printing client 18a, 18b then has the option of asking a second or a third local area print server 10 if it is available to service the printing request immediately. Thus, in effect, is another form of load balancing since the printing clients can search for a local area print server 10 with printers 16 that are best suited to service its printing request.

Moreover, the printing requests do not have to be processed in the order they are received. Other network components 18-26 can arrange to have higher priority printing requests to be serviced first. It is also possible for the other network components to stop the servicing of a printing request currently being serviced by the printing system 17, so a higher priority printing request can be serviced immediately.

The local area print server 10 makes it possible for the printers 16a, 16b to access all of the resources available within the network 12. If a resource is not locally available within the print system 17, the local area print server 10 will obtain the resource from the appropriate resource server 26 on the network 12. This makes it possible for the printers 16a, 16b to service almost any job from a network printing client 18a and 18b regardless of whether the printers 16a and 16b are locally available.

Moreover, the local area print server 10 is able to inform interested network components of the status of the printers 16a and 16b. This makes it possible for the printer 16a and 16b to be placed in a remote, unattended location. If the printers need attention, the local area print server 10 will generate the appropriate message for display at an operator monitored operator console.

Alternatively, the printing clients 18 and service manager 22 can be informed of the status of the inoperable printers 16a, 16b so they will arrange to have printing requests directed to operable printers, or refrain from making such requests until the printers become operational. This eliminates the down time other network components may have when they wait for the printers to become operational.

It is understood that this description is for the purpose of illustration only, certain changes may be made for the purposes of illustration only. For example, the local area print server 10 may be used with a single printer 16a. Alternatively, the server job controller 40 may be provided with a printer select process to decide which of a plurality of printers 16, 16b is best able to service a printing request. Furthermore, it may be desirable in some instances to provide the server job controller 40 with access to a client database 54 that contains information regarding the relative priority of specific printing clients 18a, 18b and their printing requests. This would enable the server job controller 40 to make an unassisted determination among competing printing requests which ones have the highest priority and should be serviced first. Moreover, it is understood that all the components in the local area print server described may not be necessary to practice this invention. For example, in some embodiments of this invention, it may not be necessary to provide a driver 50 to server as an interface between the printers 16 and the local area print server 10.

Therefore, it is the object of the appended claims to cover all such variations and modifications as come within the true spirit and scope of the invention.

What is claimed as new and desired to be secured by Letters Patent of the United States is:

1. A printer system connected to a data processing system via a local area network, the printer system comprising:
   A. at least one printer, the printer performing printing operations in response to received printing requests, and formulating resource fault messages to request resources and printer status messages to signal a change in status;
   B. a local area print server for receiving and managing the printing requests and supplying to the printer the printing requests and the resources required to perform requested printing operations, the print server including:
      1. network facility means, connected to the local area network, for receiving the printing requests and resource over the network and transmitting resource request messages and the printer status messages over the network,
      2. resource data storage means for storing resources received locally or from said network facility means,
      3. resource manager means for responding to resource fault messages from the printer, the resource manager including a resource directory which contains information from which the resource manager can determine if the resources requested in the resource fault messages are available within the printing system or are available outside of the printing system, the resource manager
         i. consulting the resource directory to determine if a resource is available within the printing system, and if so, supplying the resource to the printer, and otherwise
         ii. consulting the resource directory to determine if the resource is available at a remote source, and if so, acquiring the resource from the remote source and supplying the resource to the printer, the resource manager sending the resource request message to the remote source over the local area network via the network facility means, and receiving the requested resource from the remote source over the network via the network facility means,
      4. status collector means, for receiving the printer status messages from the printer, the status collector means determining, based on the particular printer status message received, a destination for the printer status message and forwarding the printer status message through the network facility means to the destination.

2. A printer system as in claim 1 wherein the resource data storage means additionally comprises:
   i. a font data memory containing resource data;
   ii. a font directory containing information indicating the location of resource data stored in the font data memory, and information indicating the location of resource data stored in the resource server; and
   the resource manager means additionally determines the location of the required resource data by reading the font directory.

3. A printer system as in claim 1 wherein the network facility means additionally receives printing request messages including printing data and printing instructions, the printer status messages provided by the printer additionally include a printer ready message, and the local area print server additionally comprises:
   i. server job controller means, connected to the network facility, means the status collector means, the resource manager, and the printer, for, in response to receiving a printing request message, storing the printing request message, and, in response to a printer ready message indicating the printer is available, retrieving a stored printing request message and transmitting the printing data and printing instructions associated with the stored printing request message to the printer, and
   wherein if the status collector means receives a resource fault message in response to transmission of the stored printing request message to the printer, the status collector means additionally enables the resource manager means to locate and then transmit the required resource data to the printer.

4. A printer system as in claim 3 wherein the local area print server is connected to two or more printers, and the server job controller selectively forwards a printing request message to a printer in accordance with the printer ready message most recently received from that printer.

5. A printer system as in claim 3 wherein the server job controller means additionally determines if a printing request message includes printing instructions, and the local area printer server additionally comprises:
   E. a global default instruction memory containing default printing instructions to be used when a printing request message does not include printing instructions; and
   F. program control means, connected to the global default instruction memory and the server job controller, for forwarding the default printing instructions when printing instructions are not supplied with a printing request message.

6. The printer system of claim 1 wherein the local area print server further includes a server job controller for determining if and in what order the printing requests received by the network facility means are to be serviced, the server job controller consulting an internal data base which contains data relating to the printer system and the network to determine if the printing system is authorized to perform a received printing request, and to determine in what order various received printing requests are to be performed, the server job controller further indicating to the status collector means where to send the printer status messages.

7. The printer system of claim 1, wherein the resource data storage means includes:
   i. a resource database which is stored within the local area print server, and
   ii. a resource database which is external to the local area print server and which is locally accessible to the print server, wherein the resource manager means supplies resources from the internal resource database and the external resource database directly to the printer.

8. A local area print server for connecting a printer to a data processing system via a local area network, the data processing system including host nodes, an operator console node, and a service manager node, the local area print server comprising:
   A. network facility means, connected to the local area network, for receiving configuration data messages from the service manager node, and for selectively transmitting a printer status message to the operator console node or one of the host nodes;
   B. configuration data storage means, connected to the network facility means, for storing configuration data; and
   C. status collector means, connected to the network facility means, the configuration data storage means and the printer, for receiving the printer status message from the printer, for retrieving from the configuration data storage means configuration data which indicates which of the host nodes or operator console node, if any, is a destination node for the printer status message, and for forwarding the printer status message through the network facility means to the destination node indicated by the configuration data.

9. A local area network server as in claim 8 wherein the printer status message indicates one of several different events, and the configuration data additionally indicates different destination nodes depending upon the type of event indicated.

10. A local area print server for connecting a printer to a data processing system via a local area network, the data processing system including host nodes, an operator console, a service manager node, and a resource server node, the local area print server comprising:
   A. network facility means, connected to the local area network, for receiving printing request messages including printing data and printing instructions from the host nodes, for transmitting resource request messages to the resource server node and receiving printer resource data in response thereto, for receiving configuration data messages from the service manager node and for selectively transmitting a printer status message to the operator console node or one of the host nodes;
   B. configuration data storage means, connected to the network facility means, for storing configuration data;
   C. status collector means, connected to the network facility means, the configuration data storage means and the printer, for receiving printer status messages, the printer status messages including printer resource fault messages, for reading from the configuration data storage means configuration data which indicates which of the host nodes or operator console node, if any, is a destination node for receiving a particular printer status message, and for forwarding the printer status message through the network facility means to the destination node indicated by the configuration data;
   D. resource data storage means, connected to the network facility means, for storing printer resource data received from the resource server node;
   E. resource manager means, connected to the network facility means, the printer, the resource data storage means and the status collector means, for determining, upon receipt of a printer resource fault message, whether required resource data is stored in the resource data storage means and, if so, transmitting the required resource data from the resource data storage means to the printer and, if not, forwarding a resource request message to the network facility means; and
   F. server job controller means, connected to the network facility means, the status collector means, the resource manager means and the printer, for, in response to receiving a printing request message, storing the printing request message and, in response to a printer status message indicating the printer is available, retrieving a stored printing request message and transmitting the printing data and printing instructions associated with the stored printing request message to the printer,
   and, wherein if the status collector means receives a resource fault message in response to transmission of the stored printing request message to the printer by the server job controller means, the status collector means additionally enables the resource manager means to locate and transmit the required resource data to the printer.

* * * * *